(12) United States Patent
Yoshida et al.

(10) Patent No.: US 6,646,848 B2
(45) Date of Patent: Nov. 11, 2003

(54) SWITCHING POWER SUPPLY APPARATUS

(75) Inventors: Koji Yoshida, Ikoma (JP); Masaaki Kuranuki, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 94 days.

(21) Appl. No.: 10/059,922

(22) Filed: Jan. 29, 2002

(65) Prior Publication Data

US 2002/0131224 A1 Sep. 19, 2002

(30) Foreign Application Priority Data

Jan. 31, 2001 (JP) ........................................ 2001-024465

(51) Int. Cl.[7] .............................. H02H 3/08; H02M 5/42
(52) U.S. Cl. ..................................... 361/93.5; 363/89
(58) Field of Search .............................. 361/93.5, 93.6, 361/93.2, 93.3, 96, 97, 84, 79; 363/79, 80, 81, 89, 97, 98, 21.15, 46, 56, 127, 132; 323/222, 282, 268, 274

(56) References Cited

U.S. PATENT DOCUMENTS

| | | | |
|---|---|---|---|
| 4,763,014 A | * | 8/1988 | Model et al. .................. 307/66 |
| 4,891,744 A | * | 1/1990 | Yamamoto Yushin et al. ... 363/89 |
| 4,974,141 A | * | 11/1990 | Severinsky et al. ........... 363/81 |
| 5,734,259 A | * | 3/1998 | Sisson et al. ................ 323/282 |
| 6,031,749 A | * | 2/2000 | Covington et al. ........... 363/98 |

FOREIGN PATENT DOCUMENTS

JP         04150764 A      5/1992

* cited by examiner

*Primary Examiner*—Rajnikant B. Patel
(74) *Attorney, Agent, or Firm*—Akin, Gump, Strauss, Hauer & Feld, L.L.P.

(57) ABSTRACT

An overcurrent protection circuit of a switching power supply apparatus, wherein a rectangular wave voltage is formed from an input voltage by the ON/OFF operation switching means, and an output voltage is formed by smoothing the rectangular wave voltage by using an inductance device and a capacitor, restricts overcurrent by detecting the peak current of a current flowing through the switching means and by using an input voltage Vin, an output voltage Vout and a voltage proportional to the ON/OFF ratio D of the switching means.

15 Claims, 14 Drawing Sheets

SWITCHING POWER SUPPLY APPARATUS

BACKGROUND OF THE INVENTION

The present invention relates to a switching power supply apparatus for supplying a stabilized DC voltage to industrial and consumer electronic apparatuses. More particularly, the present invention relates to an overcurrent protection circuit of a switching power supply apparatus. The overcurrent protection circuit prevents overcurrent flowing through the switching power supply apparatus itself and apparatuses connected to the input and output of the switching power supply apparatus in an overload condition.

In recent years, electronic apparatuses are made more inexpensive, compact, efficient and energy saving. Accordingly, switching power supply apparatuses for these electronic apparatuses are strongly demanded to have higher output stability and to be more compact and efficient. At the same time, switching power supply apparatuses being high in safety are demanded in the field of electronic apparatuses. Even when an electronic circuit serving as a load causes an abnormality and its input impedance lowers, an overcurrent protection circuit of a switching power supply apparatus satisfying the above-mentioned demands is required to appropriately restrict the current flowing through the electronic circuit serving as the load and to maintain the electronic circuit in a safe condition.

A conventional overcurrent protection circuit of a switching power supply apparatus will be described below referring to an accompanying drawing, FIG. 12. FIG. 12 shows a conventional overcurrent protection circuit for a step-down type switching power supply apparatus.

In FIG. 12, an input DC power source 201 is formed of a circuit for rectifying and smoothing a commercial power source or a battery. This input DC power source 201 is connected across input terminals 202a and 202b. A current transformer 203 has a primary winding 203a and a secondary winding 203b. One terminal of the primary winding 203a is connected to one (202a) of the input terminals 202a and 202b. The other terminal of the primary winding 203a of the current transformer is connected to one terminal of a switching device 204. The other terminal of the switching device 204 is connected to the cathode of a rectifying diode 205. Furthermore, the other terminal of the switching device 204 is connected to one terminal of an inductance device 206. The switching device 204 connected in this way is configured so as to repeat ON/OFF operation. The anode of the rectifying diode 205 is connected to the other input terminal 202b.

As shown in FIG. 12, the inductance device 206 and a smoothing capacitor 207 are connected in series, thereby forming a series element. This series element is connected across the rectifying diode 205, thereby forming a smoothing circuit. This smoothing circuit averages a rectangular wave voltage generating across the rectifying diode 205 and obtains a DC voltage.

A voltage averaged by the smoothing capacitor 207 is output across the output terminals 208a and 208b of the conventional overcurrent protection circuit of the switching power supply apparatus shown in FIG. 12. A load 209 is connected across the output terminals 208a and 208b, and consumes the power from the overcurrent protection circuit of the switching power supply apparatus.

A control circuit 210 detects the voltage across the output terminals 208a and 208b, and outputs a control signal for controlling the ON/OFF ratio of the switching device 204 so that a stabilized voltage is output. A first resistor 211 is connected in parallel with the secondary winding 203b of the current transformer 203. In the OFF period of the switching device 204, an exciting current flows through the secondary winding 203b of the current transformer 203, whereby the exciting energy of the current transformer 203 is consumed.

When the switching device 204 is ON, the current flowing through the primary winding 203a of the current transformer 203 is converted into a current corresponding to the winding ratio of the current transformer 203. The converted current flows through a second resistor 213 via a diode 212. Hence, a voltage Vs proportional to the current flowing through the primary winding 203a of the current transformer 203 generates across the second resistor 213.

The voltage Vs generating across the second resistor 213 is compared with the predetermined reference voltage of a reference power source 214 by a comparator 215. When the voltage Vs reaches the reference voltage, the switching device 204 is turned OFF via the control circuit 210. In other words, in the overcurrent protection circuit of the switching power supply apparatus shown in FIG. 12, the current flowing through the switching device 204 is detected in real time. The switching device 204 is controlled so that the instantaneous value of the current does not exceed a certain value. In this overcurrent protection circuit, the current flowing through the switching element 204, an object to be detected, passes through the inductance device 206 and becomes an output current. As a result, the operation for controlling the switching element 204 becomes an operation for restricting the output current.

In the overcurrent protection circuit of the switching power supply apparatus configured as described above, an output current Iout is the average value Iav of a current flowing through the inductance device 206. Furthermore, the peak value of a current flowing through the switching device 204, in other words, the peak value of a current flowing through the inductance device 206 is restricted in real time. The fluctuation width ΔI of the current flowing through the inductance device 206 is a function of an input voltage Vin and an output voltage Vout, and is given by the following equation (1). In Equation (1), D designates a duty ratio, that is, the ON/OFF ratio of the switching device 204, Ts designates a switching cycle, and Lf designates the inductance value of the inductance device 206.

$$\Delta_I = \frac{V_{out}(1-D)T_s}{L_f} \tag{1}$$

Accordingly, the relationship between the peak value Ip of the current flowing through the inductance device 206 and the average value Iav of the current flowing through the inductance device 206 is represented by the following equation (2).

$$I_p = I_{av} + \frac{\Delta I}{2} = I_{av} + \frac{V_{out}(1-D)T_s}{2L_f} \tag{2}$$

FIG. 13 is a graph showing current waveforms during the operation of the conventional overcurrent protection circuit. Even when the output current is made constant, the peak voltage differs depending on the input voltage. Hence, in the configuration of the conventional overcurrent protection circuit, control is carried out so that the peak value Ip of the current flowing through the inductance device 206 becomes constant. As a result, the output current Iout has a characteristic of changing together with the fluctuations in the output voltage Vout and the input voltage Vin. FIG. 14 is a waveform graph showing an overcurrent drooping characteristic in the conventional overcurrent protection circuit. When the output voltage Vout lowers as shown in FIG. 14, the output current Iout increases abruptly. In particular, when the inductance value Lf of the inductance device 206 is small, the fluctuation width ΔI of the current flowing through the inductance device 206 becomes large. The difference between the peak value Ip and the average value Iav of the current increases. As a result, the drooping characteristic becomes worse in this case, and the output current Iout increases. As the output current Iout increases in this way, the currents flowing through the switching device 204 and the rectifying diode 205 become larger. For this reason, devices having a large breakdown resistance are required to be used for the switching device 204 and the rectifying diode 205 of the conventional overcurrent protection circuit. This raises problems of making the circuit expensive and large.

SUMMARY OF THE INVENTION

The present invention is intended to solve the problems encountered in the above-mentioned conventional overcurrent protection circuit. More particularly, the present invention is intended to provide a switching power supply apparatus being high in safety and capable of carrying out overcurrent protection stably and securely. This is attained by restricting the output current of a circuit comprising circuit devices having small inductances at a constant value, even when its input voltage and output voltage change.

In order to attain the above-mentioned object, the switching power supply apparatus in accordance with the present invention may comprise:

switching means for forming a rectangular wave voltage by turning ON/OFF an input voltage (Vin), a smoothing circuit for forming an output voltage (Vout) by smoothing the rectangular wave voltage by using an inductance device and a capacitor, and overcurrent protection means for restricting an output current by detecting the peak current of a current flowing through the switching means, wherein in the overcurrent protection means, by using the input voltage (Vin), the output voltage (Vout) and a voltage proportional to the ON/OFF ratio (D) of the switching means, the detected peak current value is corrected by an error signal proportional to the value of (Vout−D×Vout).

The switching power supply apparatus in accordance with the present invention configured as described above can restrict the output current to a constant value, even when the input voltage and the output voltage change in a circuit comprising circuit devices having small inductances. As a result, the overcurrent protection circuit can perform overcurrent protection safely and securely.

In addition, the switching power supply apparatus in accordance with the present invention may comprise a multiplier for forming the error signal.

Furthermore, in the switching power supply apparatus in accordance with the present invention, the overcurrent protection means may be further provided with peak voltage holding means.

The switching power supply apparatus in accordance with another aspect of the present invention may comprise:

switching means for forming a rectangular wave voltage by turning ON/OFF an input voltage (Vin), an insulating transformer having a primary winding connected to the switching means and a secondary winding connected to an output terminal, the winding ratio of the windings being N:1, output voltage forming means, connected to the secondary winding, for forming an output voltage by carrying out rectification and smoothing by using rectifying means, an inductance device and a capacitor, and overcurrent protection means for restricting an output current by detecting the peak current of a current flowing through the switching means, wherein in the overcurrent protection means, by using the input voltage (Vin), the output voltage (Vout) and the ON/OFF ratio (D) of the switching means, the detected peak current value is corrected by an error signal proportional to the value of (Vout−D×Vout).

The switching power supply apparatus in accordance with the present invention configured as described above can make the output current constant during the operation of the overcurrent protection means regardless of changes in the input voltage and the output voltage.

Still further, the switching power supply apparatus in accordance with the present invention may comprise a multiplier for forming the error signal.

Still further, in the switching power supply apparatus in accordance with the present invention, the switching power supply apparatus may have an insulating transformer and may be formed of a full-bridge converter.

Still further, the overcurrent protection circuit of the switching power supply apparatus in accordance with the present invention may comprise:

a first series circuit of first switching means and second switching means repeatedly turning ON/OFF alternately and connected in series at a first connection point, a second series circuit of third switching means and fourth switching means repeatedly turning ON/OFF alternately and connected in series at a second connection point, the transformer having a primary winding connected between the first connection point and the second connection point, rectangular wave voltage applying means for applying a rectangular wave voltage to the primary winding of the transformer, rectifying means for rectifying voltages induced across the secondary windings of the transformer, a smoothing circuit for smoothing the rectangular wave voltage from the rectifying means by using an inductance device and a capacitor and for outputting a smoothed voltage, and a circuit for forming a voltage proportional to the output voltage by averaging the voltage at the first connection point.

Still further, the switching power supply apparatus in accordance with the present invention may comprise:

the first series circuit of the first switching means and the second switching means repeatedly turning ON/OFF alternately and connected in series at the first connection point, the second series circuit of the third switching means and the fourth switching means repeatedly turning ON/OFF alternately and connected in series at the second connection point, the transformer having the primary winding connected between the first connection point and the second connection point, the rectangular wave voltage applying means for applying the rectangular wave voltage to the primary winding of the transformer, a smoothing circuit for smoothing rectangular wave voltages induced across the secondary windings of the transformer by using an inductance device and a capacitor and for outputting a smoothed voltage, an averaging circuit for forming voltages proportional to the output voltage by averaging the voltage at the first connection point and the voltage at the second connection point, and an error signal forming circuit for forming an error signal obtained by averaging the difference voltage between the input voltage and the output voltage at the time when the first switching means or the second switching means is ON.

The detected peak current may be corrected by the value of {D×(Vin−Vout)} instead of the value of (Vout−D×Vout).

Still further, in the switching power supply apparatus in accordance with the present invention, said detected peak current may be corrected by the value of {D×(Vin−N× Vout)} instead of the value of (Vout−D×Vout).

Still further, in the switching power supply apparatus in accordance with the present invention, the detected peak current may be corrected by both a value proportional to (Vout−D×Vout) and a value proportional to (Vin−Vout).

Still further, in the switching power supply apparatus in accordance with the present invention, said detected peak current may be corrected by both a value proportional to (Vout−D×Vout) and a value proportional to (Vin−N×Vout).

Still further, in the switching power supply apparatus in accordance with the present invention, the detected peak current may be corrected by both a value proportional to {D×(Vin−Vout)} and a value proportional to (Vin−Vout) instead of the value of (Vout−D×Vout).

Still further, in the switching power supply apparatus in accordance with the present invention, said detected peak current may be corrected by both a value proportional to {D×(Vin−N×Vout)} and a value proportional to (Vin−N× Vout) instead of the value of (Vout−D×Vout).

The switching power supply apparatus in according with still another aspect of the present invention may comprise:

switching means for forming a rectangular wave voltage by turning ON/OFF an input voltage (Vin), an inductance device for storing exciting energy at the time when the switching means is ON and the input voltage is applied and for outputting the stored exciting energy at the time when the switching means is OFF, and overcurrent protection means for restricting the output current by detecting the peak current (Ip) of the current flowing through the switching means, wherein the overcurrent protection means carries out the arithmetic operation of {(1−D)×(Ip+K×Vout)} with respect to the detected peak current Ip and with K used as a constant, and determines the ON period of the switching means so that the arithmetically operated value becomes constant.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the figures are schematic representations for purposes of illustration and do not necessarily depict the actual relative sizes or locations of the elements shown.

DETAILED DESCRIPTION OF THE INVENTION

Preferred embodiments of an overcurrent protection circuit of a switching power supply apparatus in accordance with the present invention will be described below referring to the accompanying drawings.

Embodiment 1

Figure 1:
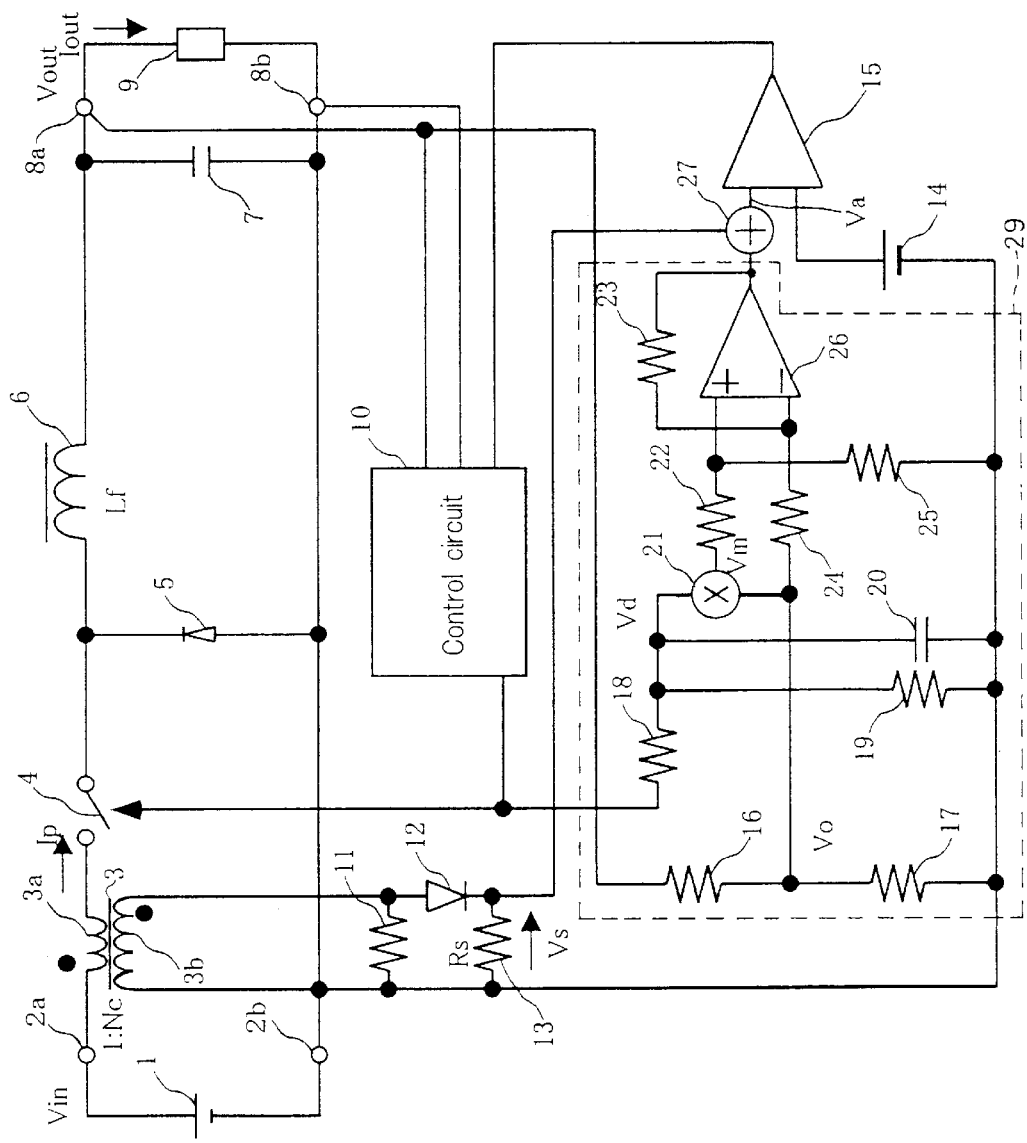
FIG. 1 is a circuit diagram showing a configuration of an overcurrent protection circuit of a switching power supply apparatus in accordance with Embodiment 1 of the present invention.

FIG. 1 is a circuit diagram showing a configuration of an overcurrent protection circuit of a switching power supply apparatus in accordance with Embodiment 1 of the present invention.

In FIG. 1, an input DC power source 1 is formed of a circuit for rectifying and smoothing a commercial power source or a battery. This input DC power source 1 is connected across input terminals 2a and 2b. A current transformer 3 has a primary winding 3a and a secondary winding 3b. One terminal of the primary winding 3a is connected to one (2a) of the input terminals 2a and 2b. The other terminal of the primary winding 3a of the current transformer 3 is connected to one terminal of a switching device 4. The other terminal of the switching device 4 is connected to the cathode of a rectifying diode 5 and one terminal of an inductance device 6. The switching device 4 connected in this way is turned ON/OFF repeatedly by a control signal from a control circuit 10 described later. The anode of the rectifying diode 5 is connected to the other input terminal 2b.

As shown in FIG. 1, the inductance device 6 and a smoothing capacitor 7 are connected in series, thereby forming a series circuit. This series circuit is connected across the rectifying diode 5, thereby forming a smoothing circuit. This smoothing circuit averages a rectangular wave voltage generating across the rectifying diode 5, thereby forming a DC voltage.

A voltage averaged by the smoothing capacitor 7 is output across the output terminals 8a and 8b of the overcurrent protection circuit of the switching power supply apparatus in accordance with Embodiment 1 shown in FIG. 1. A load 9 is connected across the output terminals 8a and 8b, and consumes the power from the overcurrent protection circuit of the switching power supply apparatus.

A control circuit 10 detects the voltage across the output terminals 8a and 8b, and outputs a control signal for controlling the ON/OFF ratio of the switching device 4 so that a stabilized voltage is output. A first resistor 11 is connected in parallel with the secondary winding 3b of the current transformer 3. In the OFF period of the switching device 4, an exciting current flows through the secondary winding 3b of the current transformer 3, whereby the exciting energy of the current transformer 3 is consumed.

A diode 12 rectifies a current induced at the secondary winding 3b of the current transformer 3. A second resistor 13 generates a voltage proportional to a current flowing through the primary winding 3a of the current transformer 3 in real time.

When the switching device 4 is ON, the current flowing through the primary winding 3a of the current transformer 3 is converted into a current corresponding to the winding ratio of the current transformer 3. The converted current flows through the second resistor 13 via the diode 12. Hence, a voltage Vs proportional to the current flowing through the primary winding 3a of the current transformer 3 generates across the second resistor 13.

The voltage Vs generating across the second resistor 13 is added to a voltage from a corrected voltage generation circuit 29 described later, and input to one terminal of a comparator 15. A reference voltage from a reference power source 14 is input to the other terminal of the comparator 15. The voltage corrected by the corrected voltage generation circuit 29 is compared with the reference voltage by the comparator 15. When the corrected voltage reaches the reference voltage, the switching device 4 is turned OFF via the control circuit 10.

Next, the configuration of the corrected voltage generation circuit 29 in accordance with Embodiment 1 will be described below.

In the corrected voltage generation circuit 29, the output voltage Vout is divided by a third resistor 16 and a fourth resistor 17. In addition, the control signal of the control circuit 10, that is, an ON/OFF signal, is averaged by a fifth resistor 18, a sixth resistor 19 and a capacitor 20, thereby forming a voltage Vd proportional to the ON/OFF ratio (duty ratio) D.

The voltage Vd and a voltage Vo proportional to the output voltage Vout are input to a multiplier 21, and the product of the voltages is calculated and output as a voltage Vm.

In the corrected voltage generation circuit 29, a seventh resistor 22, an eighth resistor 23, a ninth resistor 24, a 10th resistor 25 and an operational amplifier 26 are provided as shown in FIG. 1. The seventh resistor 22 is connected between the multiplier 21 and the noninverting input terminal of the operational amplifier 26. The ninth resistor 24 is connected between the input terminal of the multiplier 21, to which the voltage Vo is input, and the inverting input terminal of the operational amplifier 26. Furthermore, the eighth resistor 23 is connected between the inverting input terminal and the output terminal of the operational amplifier 26. The 10th resistor 25 is connected between the noninverting input terminal of the multiplier 21 and the ground.

The difference between the voltage Vo proportional to the output voltage Vout and the output voltage Vm of the multiplier 21 is calculated by using these resistors 22, 23, 24 and 25 and the operational amplifier 26. An adder 27 calculates the sum of the voltage Vs generating across the second resistor 13 and a voltage output from the operational amplifier 26, and outputs the sum to the comparator 15. The output of the adder 27, that is, a voltage Va, and the reference voltage Vr of the reference power source 14 are input to the comparator 15. The comparator 15 compares the voltage Va with the reference voltage Vr and determines the turning OFF timing of the switching device 4.

Next, the operation of the overcurrent protection circuit of the switching power supply apparatus in accordance with Embodiment 1 configured as described above will be described below.

When the switching device 4 is turned ON by the control signal (an ON/OFF signal) from the control circuit 10, an input voltage Vin is applied to the inductance device 6 via the primary winding 3a of the current transformer 3 and the switching device 4. At this time, the same amount of current as that flowing through the inductance device 6 flows through the switching device 4 and the primary winding 3a of the current transformer 3. Hence, a voltage generates across the secondary winding 3b of the current transformer 3, and the diode 12 turns ON. As a result, a current generating at the secondary winding 3b of the current transformer 3 flows through the second resistor 13 via the diode 12. The resistance value of the first resistor 11 is sufficiently larger than that of the second resistor 13, whereby a current flowing through the first resistor 11 is made sufficiently smaller than a current flowing through the second resistor 13.

When it is assumed that the current flowing through the primary winding 3a of the current transformer 3 is Ip and that the winding ratio of the primary winding 3a to the secondary winding 3b of the current transformer 3 is 1:Nc, the voltage Vs generating across the second resistor 13 (having a resistance value Rs) is represented by the following equation (3).

$$V_s = \frac{1}{N_c} R_s I_p \quad (3)$$

When the winding ratio Nc is set at a sufficiently large value and the resistance value Rs is set at a small value in Equation (3), the voltage generating across the primary winding 3a of the current transformer 3 becomes sufficiently smaller than the input voltage Vin. For this reason, the difference voltage (Vin−Vout) between the input voltage Vin and the output voltage Vout is applied to the inductance device 6. At this time, the current flowing through the inductance device 6 (having an inductance value Lf) increases at an inclination of (Vin−Vout)/Lf.

Next, when the switching device 4 is turned OFF by the control signal of the control circuit 10, the rectifying diode 5 is turned ON by the current having been flowing through the inductance device 6, and the output voltage Vout is applied to the inductance device 6. In this state, the current flowing through the inductance device 6 decreases at an inclination of Vout/Lf. At this time, no current flows through the primary winding 3a of the current transformer 3. The exciting current of the current transformer 3 flows through the first resistor 11, whereby the exciting energy of the current transformer 3 is consumed. Hence, the transformer 3 is reset at a zero energy state. The following equation (4) is established when it is assumed that the ON period of the switching device 4 is Ton, that the OFF period thereof is Toff, and that the amount of current increasing at the inductance 6 in the ON period is equal to the amount of current decreasing in the OFF period.

$$\frac{(V_{in} - V_{out})}{L_f} T_{on} = \frac{V_{out}}{L_f} T_{off} \quad (4)$$

Hence, the output voltage Vout is calculated by using the ON/OFF ratio of the switching device 4 as represented by the following equation (5).

$$V_{out} = \frac{T_{on}}{T_{on} + T_{off}} V_{in} = DV_{in} \quad (5)$$

The peak value Ip of the current flowing through the inductance device 6 is represented by the following equation (6) as explained in the descriptions of the above-mentioned prior art.

$$I_p = I_{av} + \frac{\Delta I}{2} = I_{av} + \frac{V_{out}(1-D)T_s}{2L_f} \quad (6)$$

Since the average value Iav of the current flowing through the inductance device 6 is equivalent to the output current Iout in Equation (6), Equation (6) is represented by the following equation (7).

$$I_{out} = I_p - \frac{V_{out}(1-D)T_s}{2L_f} = I_p - \left(\frac{T_s}{2L_f}\right)(V_{out} - V_{out}D) \quad (7)$$

Referring to Equation (6), in order to maintain the output voltage constant in an overcurrent region, it is understood that the peak value Ip of the current to be restricted should be changed as represented by Equation (6) depending on the changes in the input voltage Vin and the output voltage Vout.

In other words, it is understood that the correction function of the second term of Equation (6) should be added to the reference voltage for an overcurrent, or that the difference between an actually detected current waveform and the value of the second term of Equation (7) should be obtained.

In the corrected voltage generation circuit 29 in the overcurrent protection circuit shown in FIG. 1, the difference between the detected output voltage Vout and the output of the correction function is obtained. In order to obtain the correction amount from the second term of Equation (6), it is understood that the detection of the output voltage Vout and the duty ratio D are necessary.

In the corrected voltage generation circuit 29 shown in FIG. 1, the output voltage Vout is divided by the third resistor 16 connected to the output terminal 8a and the fourth resistor 17 connected to the output terminal 8b, and detected. The duty ratio D is obtained by averaging the control signal of the control circuit 10. In the corrected voltage generation circuit 29, the control signal of the control circuit 10 is divided and averaged by the fifth resistor 18, the sixth resistor 19 and the capacitor 20. The correction amount represented by the second term of Equation (6) is obtained by multiplying the duty ratio D with the output voltage Vout and by obtaining the difference between the product of the multiplication and the output voltage Vout. For this reason, in the corrected voltage generation circuit 29 in accordance with Embodiment 1, the multiplication is carried out by the multiplier 21. In addition, the correction amount is calculated by a differential amplifier circuit comprising the plurality of resistors 22, 23, 24 and 25 and the operational amplifier 26.

Figure 2:
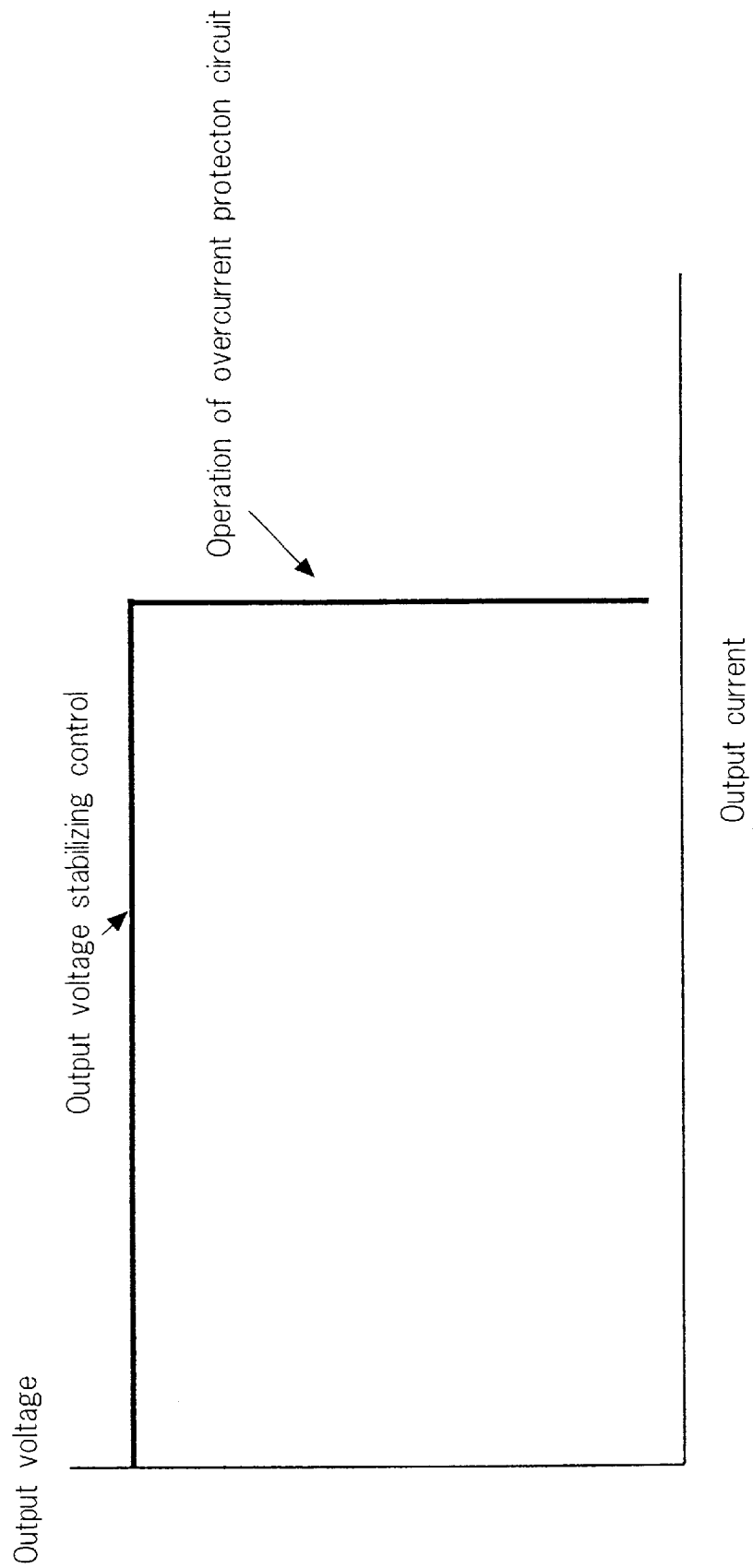
FIG. 2 is a graph showing the overcurrent drooping characteristic of the overcurrent protection circuit in accordance with Embodiment 1.

FIG. 2 is a waveform graph showing the overcurrent drooping characteristic of the corrected voltage generation circuit 29 of the overcurrent protection circuit of the switching power supply apparatus in accordance with Embodiment 1 of the present invention. FIG. 2 indicates that the output current does not increase but is controlled so as to be constant when the input voltage Vin and the output voltage Vout change and the overcurrent protection circuit activates.

Figure 3:
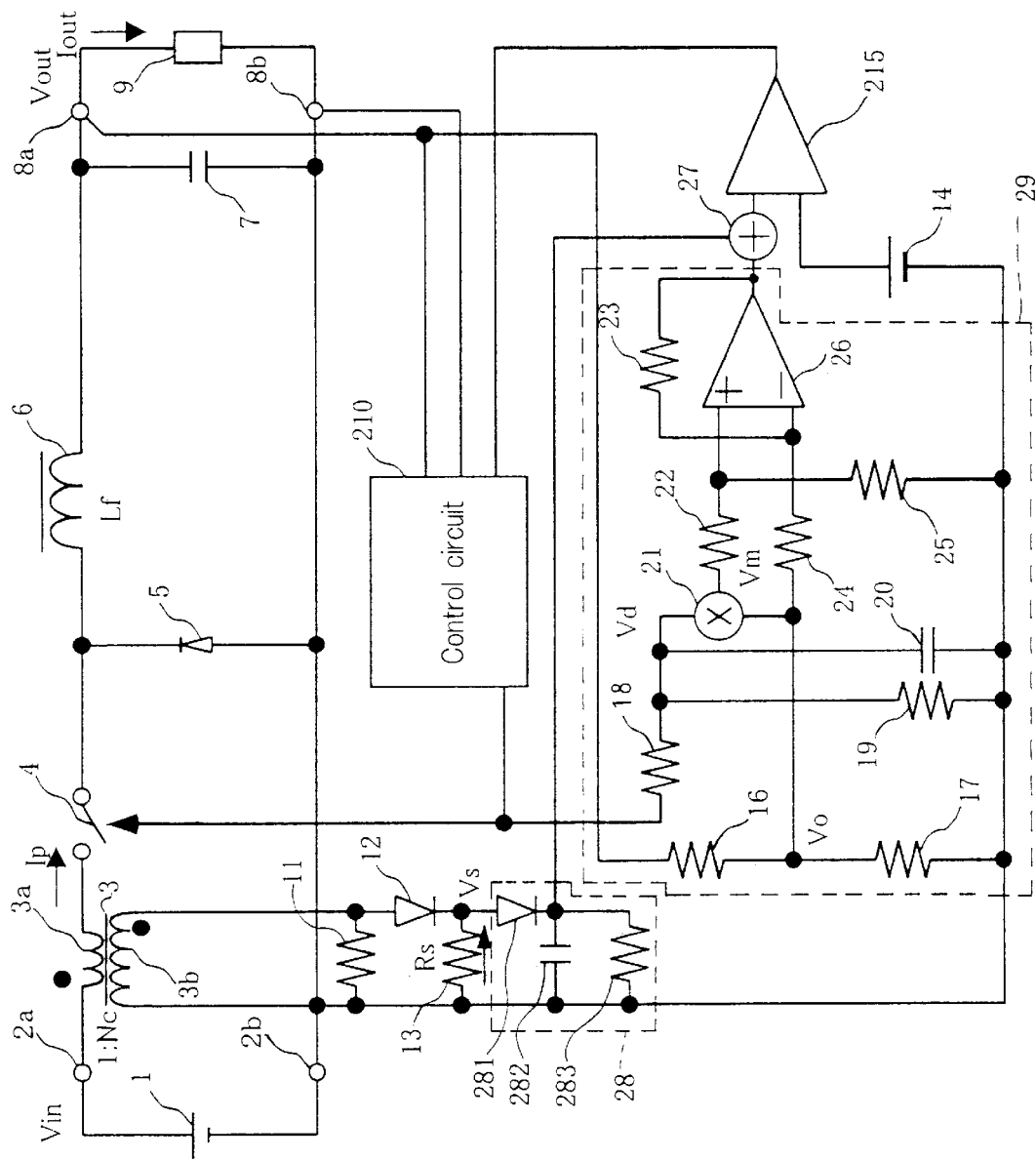
FIG. 3 is a circuit diagram showing another configuration of the overcurrent protection circuit in accordance with Embodiment 1.

FIG. 3 is a circuit diagram showing another configuration of the overcurrent protection circuit of the switching power supply apparatus in accordance with Embodiment 1 of the present invention. The configuration of the overcurrent protection circuit shown in FIG. 3 differs from the above-mentioned overcurrent protection circuit shown in FIG. 1 in the following points. A peak holding circuit 28 is provided, and a control circuit 210 performs control so that the sum of the output of the peak holding circuit 28 and the output of the corrected voltage generation circuit 29 becomes constant. In the overcurrent protection circuit shown in FIG. 3, numeral 215 designates an error amplifier, and numeral 210 designates the control circuit. In this overcurrent protection circuit, the reference voltage of the reference power source 14 and the sum of the output of the peak holding circuit 28 and the output of the corrected voltage generation circuit 29 are error-amplified by the error amplifier 215. The output of the error amplifier 215 is input to the control circuit 210. The control circuit 210 performs control on the basis of the error amplification signal so that the sum of the output of the peak holding circuit 28 and the output of the corrected voltage generation circuit 29 becomes constant. Since the other configurations of the overcurrent protection circuit shown in FIG. 3 are the same as those of the overcurrent protection circuit shown in FIG. 1, their explanations are omitted.

In FIG. 3, the first resistor 11 is connected in parallel with the secondary winding 3b of the current transformer 3. In the OFF period of the switching device 4, an exciting current flows through the secondary winding 3b of the current transformer 3, whereby the exciting energy of the current transformer 3 is consumed. The diode 12 rectifies the current induced at the secondary winding 3b of the current transformer 3. The second resistor 13 generates a voltage proportional to the current flowing through the primary winding 3a of the current transformer 3.

As shown in FIG. 3, the peak holding circuit 28 comprises a diode 281, a capacitor 282 and a resistor 283. The peak holding circuit 28 configured as described above is connected to the rear stage of the second resistor 13, and holds the peak voltage of the voltage proportional to the current flowing through the primary winding 3a of the current transformer 3. The output of the peak holding circuit 28 is input to one terminal of the adder 27. The voltage from the corrected voltage generation circuit 29 is input to the other terminal of the adder 27. In the overcurrent protection circuit shown in FIG. 3, overcurrent protection control is performed by adding a correction amount to a peak voltage obtained by the peak charging of a voltage generating across the second resistor 13 and being proportional to the current flowing through the primary winding 3a of the current transformer 3. Hence, the overcurrent protection circuit shown in FIG. 3 can securely maintain the output current constant.

In the overcurrent protection circuit shown in FIG. 1, the switching current increases in the period from the reception of the turning OFF signal to the actual OFF operation because of the turning OFF delay times of the comparator 15 and the switching device 4. This increases the output current of the overcurrent protection circuit shown in FIG. 1. However, in the overcurrent protection circuit shown in FIG. 3, its output current can be securely made constant thanks to negative feedback by using the error amplifier 215.

Embodiment 2

Figure 4:
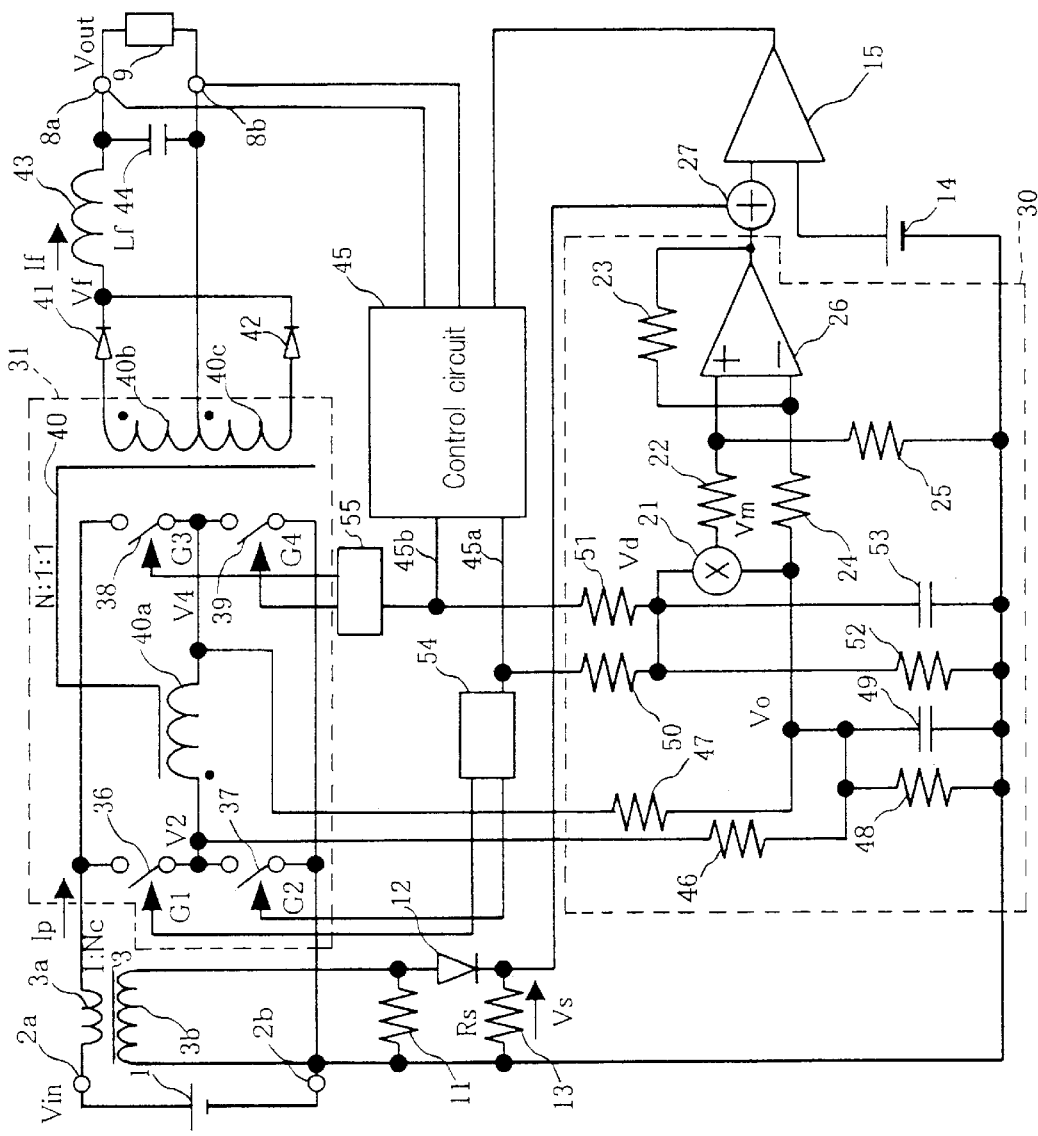
FIG. 4 is a circuit diagram showing a configuration of an overcurrent protection circuit of a switching power supply apparatus in accordance with Embodiment 2 of the present invention.

Next, an overcurrent protection circuit of a switching power supply apparatus in accordance with Embodiment 2 of the present invention will be described below referring to an accompanying drawing, FIG. 4. FIG. 4 is a circuit diagram showing a configuration of the overcurrent protection circuit of the switching power supply apparatus in accordance with Embodiment 2. In FIG. 4, the same components in terms of functions and configurations as those of the overcurrent protection circuit in accordance with Embodiment 1 described above are designated by the same numerals, and their explanations are omitted. In the explanations of the following embodiments, the same resistors in terms of functions in the overcurrent protection circuits are designated by the same numerals. The numbers in their names are made consistent only in each embodiment.

In FIG. 4, the input DC power source 1 is formed of a circuit for rectifying and smoothing a commercial power source or a battery, and connected across the input terminals 2a and 2b. The current transformer 3 has the primary winding 3a and the secondary winding 3b, and one terminal of the primary winding 3a is connected to one (2a) of the input terminals 2a and 2b. The other terminal of the primary winding 3a of the current transformer 3 is connected to a switching circuit 31 comprising a plurality of switching devices 36, 37, 38 and 39 and a transformer 40.

The first resistor 11 is connected in parallel with the secondary winding 3b of the current transformer 3. The diode 12 rectifies a current induced at the secondary winding 3b of the current transformer 3, and a voltage proportional to a current flowing through the primary winding 3a of the current transformer 3 generates across the second resistor 13.

The switching circuit 31 has a series circuit comprising a first switching device 36 and a second switching device 37, and a series circuit comprising a third switching device 38 and a fourth switching device 39. These series circuits are connected to the input terminal 2a via the primary winding 3a of the current transformer 3 and also connected to the input terminal 2b. The first switching device 36 and the second switching device 37 are configured so as to repeat ON/OFF operations alternately. Furthermore, the third switching device 38 and the fourth switching device 39 are also configured so as to repeat ON/OFF operations alternately.

One terminal of the primary winding 3a of the current transformer 3 is connected to the input terminal 2a, and the other terminal is connected to the connection point of the first switching device 36 and the third switching device 38.

The transformer 40 has a primary winding 40a, a first secondary winding 40b and a second secondary winding 40c. One terminal of the primary winding 40a is connected to the connection point of the first switching device 36 and the second switching device 37. The other terminal of the primary winding 40a is connected to the connection point of the third switching device 38 and the fourth switching device 39. The first secondary winding 40b and the second secondary winding 40c of the transformer 40 are connected in series.

The anode of a first rectifying diode 41 is connected to one terminal of the first secondary winding 40b of the transformer 40. The anode of a second rectifying diode 42 is connected to one terminal of the second secondary winding 40c of the transformer 40. The cathode of the first rectifying diode 41 is connected to the cathode of the second rectifying diode 42, thereby forming a rectifying circuit.

A series circuit comprising an inductance device 43 and a smoothing capacitor 44 is provided on the secondary side of the transformer 40. The series circuit comprising the inductance device 43 and the smoothing capacitor 44 forms a smoothing circuit. One terminal of this smoothing circuit is connected to the connection point of the first secondary winding 40b and the second secondary winding 40c of the transformer 40. The other terminal of the smoothing circuit is connected to the connection point of the first rectifying diode 41 and the second rectifying diode 42. The smoothing capacitor 44 is connected across the output terminals 8a and 8b. A voltage averaged by the smoothing capacitor 44 is output across the output terminals 8a and 8b. The load 9 is connected across the output terminals 8a and 8b, and consumes the power from the overcurrent protection circuit of the switching power supply apparatus.

In FIG. 4, a control circuit 45 outputs a control signal for determining the ON/OFF operations of the switching devices 36, 37, 38 and 39 of the switching circuit 31. The control signal output from the control circuit 45 makes the voltage across the output terminals 8a and 8b constant, or determines the ON/OFF ratio on the basis of an overcurrent turning OFF signal.

In Embodiment 2, a corrected voltage generation circuit 30 comprises a third resistor 46, a fourth resistor 47, a fifth resistor 48 and a first capacitor 49. One terminal of the series circuit comprising the third resistor 46 and the fifth resistor 48 is connected to the connection point of the first switching device 36 and the second switching device 37. Furthermore, the other terminal of the series circuit is connected to the connection point of the second switching device 37 and the fourth switching device 39. One terminal of the first capacitor 49 is connected to the connection point of the second switching device 37 and the fourth switching device 39. The other terminal of the first capacitor 49 is connected to the fourth resistor 47.

One terminal of the fourth resistor 47 is connected to the connection point of the third switching device 38 and the fourth switching device 39. The other terminal of the fourth resistor 47 is connected to the connection point of the third resistor 46 and the fifth resistor 48. The first capacitor 49 is connected in parallel with the fifth resistor 48. A voltage obtained by dividing and averaging the voltage across the second switching device 37 and the voltage across the fourth switching device 39 generates across the first capacitor 49.

Furthermore, the corrected voltage generation circuit 30 in accordance with Embodiment 2 is provided with a sixth resistor 50, a seventh resistor 51 and an eighth resistor 52. One terminal of the series circuit comprising the sixth resistor 50 and the eighth resistor 52 is connected to the first output terminal 45a of the control circuit 45. The other terminal of the series circuit is connected to the connection point of the second switching device 37 and the fourth switching device 39. One terminal of the seventh resistor 51 is connected to the second output terminal 45b of the control circuit 45. The other terminal of the seventh resistor 51 is connected to the connection point of the sixth resistor 50 and the eighth resistor 52. A second capacitor 53 is connected in parallel with the eighth resistor 52. A voltage obtained by dividing and averaging output voltages at the first output terminal 45a and the second output terminal 45b of the control circuit 45 generates across the second capacitor 53. The obtained voltage is proportional to the ON/OFF ratio D of the output of the control circuit 45.

The multiplier 21 calculates the product (a voltage Vm) of the voltage Vo generating across the first capacitor 49 and the voltage Vd generating across the second capacitor 53.

Furthermore, the corrected voltage generation circuit 30 in accordance with Embodiment 2 is provided with the plurality of resistors 22, 23, 24 and 25 and the operational amplifier 26, just as in the case of Embodiment 1 described above. This circuit calculates the difference between the voltage Vm and the voltage Vo. In Embodiment 2, these resistors connected to the operational amplifier 26 are referred to as a ninth resistor 22, a 10th resistor 23, an 11th resistor 24 and a 12th resistor 25.

The adder 27 outputs the sum of the voltage Vs generating across the second resistor 13 and the voltage from the corrected voltage generation circuit 30. The reference voltage of the reference power source 14 and the sum voltage output from the adder 27 are input to the comparator 15 and compared with each other. When it is judged by the comparison that an overcurrent state has occurred, the comparator 15 outputs a turning OFF signal to the control circuit 45.

Figure 5:
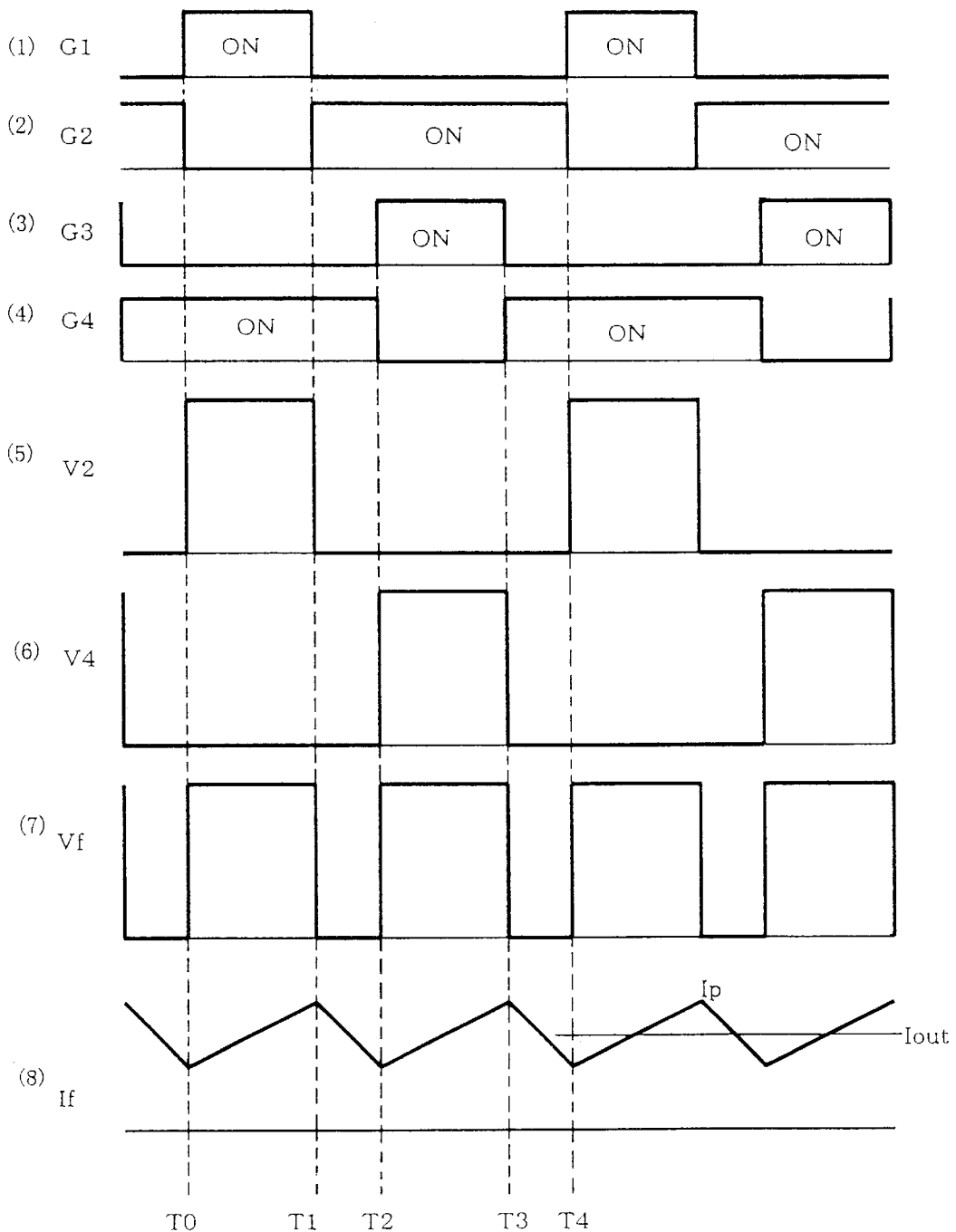
FIG. 5 is a waveform diagram showing the operation of the overcurrent protection circuit in accordance with Embodiment 2.

The operation of the overcurrent protection circuit of the switching power supply apparatus in accordance with Embodiment 2 configured as described above will be described below referring to FIG. 4 and FIG. 5. FIG. 5 is a waveform diagram showing the operation of the overcurrent protection circuit of the overcurrent protection circuit in accordance with Embodiment 2.

The control circuit 45 (in FIG. 4) detects the voltage across the output terminals 8a and 8b, and outputs PWM signals so that the output voltage becomes constant. The ON/OFF signals serving as control signals at this time operate at a phase difference of 120 degrees therebetween, and the maximum duty ratio thereof is set at 50%. The PWM signals of the control circuit 45 are output to a first drive circuit 54 and a second drive circuit 55. The first drive circuit 54 outputs a drive signal to turn ON/OFF the first switching device 36 in synchronization with the ON/OFF timing of the first PWM signal having been input. At the same time, the first drive circuit 54 outputs a drive signal so that the second switching device 37 repeats ON/OFF operation complementarily to the first PWM signal. Similarly, the second drive circuit 55 outputs a drive signal to turn ON/OFF the third switching device 38 in synchronization with the second PWM signal. The second drive circuit 55 also outputs a drive signal so that the fourth switching device 39 repeats ON/OFF operation complementarily to the second PWM signal.

The control circuit 45 drives and controls the first drive circuit 54 and the second drive circuit 55 as described above, whereby a voltage V2 applied to the second switching device 37 and a voltage V4 applied to the fourth switching device 39 have waveforms shown in parts (5) and (6) of FIG. 5, respectively. Hence, when the first switching device 36 is ON (in the T0-to-T1 period shown in a part (1) of FIG. 5), the fourth switching device 39 becomes ON simultaneously (see a part (4) of FIG. 5), and the input voltage Vin is applied to the primary winding 40a of the transformer 40. At this time, voltages (Vin/N) generate across the first secondary winding 40b and across the second secondary winding 40c of the transformer 40 depending on the winding ratio N of the transformer 40. By the voltages generating across the first secondary winding 40b and across the second secondary winding 40c of the transformer 40, the first rectifying diode 41 turns ON and the second rectifying diode 42 turns OFF. As a result, the difference between the voltage (Vin/N) and the output voltage, (Vin/N−Vout), is applied to the inductance device 43.

When both the first switching device 36 (see the part (1) of FIG. 5) and the third switching device 38 (see a part (3) of FIG. 5) are OFF, both the second switching device 37 (see a part (2) of FIG. 5) and the fourth switching device 39 (see the part (4) of FIG. 5) are ON as shown in FIG. 5. Hence, both the voltage V2 applied to the second switching device 37 and the voltage V4 applied to the fourth switching device 39 become 0 V, whereby the primary winding 40a of the transformer 40 is short-circuited and the voltage applied thereto becomes zero. As a result, no voltage generates across the secondary windings 40b and 40c of the transformer 40. The current flowing through the inductance device 43 is diverted by the first rectifying diode 41 and the second rectifying diode 42, whereby the voltage applied to the inductance device 43 becomes the output voltage Vout.

When the third switching device 38 is ON (in the T2-to-T3 period shown in the part (3) of FIG. 5), the second switching device 37 becomes ON. Hence, the input voltage Vin is applied to the primary winding 40a of the transformer 40 in a direction opposite to that in the T0-to-T1 period. Therefore, voltages (Vin/N) generate across the secondary windings 40b and 40c of the transformer 40 in the opposite direction. The first rectifying diode 41 turns OFF, and the second rectifying diode 42 turns ON. A voltage, (Vin/N−Vout), is thus applied to the inductance device 43.

As a result, when control is performed so that the ON period of the first switching device 36 and the ON period of the third switching device 38 have an equal value (Ton), two periods, that is, the T1-to-T2 period and the T3-to-T4 period, wherein both the first switching device 36 and the third switching device 38 turn OFF, have an equal value (Toff). Since the increase and decrease of the exciting current of the inductance device 43 are equal to each other in the steady state, the following equation is established.

$$T_{on} \cdot \left(\frac{V_{in}}{N} - V_{out}\right) = T_{off} \cdot V_{out} \quad (8)$$

The output voltage Vout is thus represented as follows.

$$V_{out} = \frac{T_{on}}{(T_{on} + T_{off})N} \cdot V_{in} \quad (9)$$

On the other hand, since the input voltage Vin is applied only when the first switching device 36 is ON, the average voltage V2av of the voltage V2 applied to the second switching device 37 is represented as follows.

$$V_{2av} = \frac{T_{on}}{2(T_{on} + T_{off})} \cdot V_{in} \quad (10)$$

Hence, even if the input voltage Vin and the output voltage Vout change, the output voltage Vout is always proportional to the average voltage V2av. In a similar way, the average voltage V4av of the applied voltage V4 is proportional to th e output voltage Vout. Therefore, the voltage Vo obtained by dividing and averaging the applied voltage V2 and the applied voltage V4 by using the third resistor 46, the fourth resistor 47 and the first capacitor 49 is proportional to the output voltage Vout.

Furthermore, the average value of the PWM outputs of the control circuit 45 is proportional to the ON/OFF ratio. Hence, the voltage obtained by dividing and averaging the outputs by using the sixth resistor 50, the seventh resistor 51 and the second capacitor 53 is proportional to the ON/OFF ratio of the PWM signal.

When the inductance value of the inductance device 43 is small in the overcurrent protection circuit of the switching power supply apparatus in accordance with Embodiment 2, the output current Iout differs from the peak value Ip of the current flowing through the inductance device 43. In other words, the relationship between the output current Iout and the peak value Ip changes depending on the input voltage Vin and the output voltage Vout. The current flowing through the inductance device 43 is transmitted to the primary winding 40a via the transformer 40, and flows through the primary winding 3a of the current transformer 3. Hence, if the transformer 40 is eliminated, the configuration of Embodiment 2 becomes almost equivalent to the configuration of Embodiment 1 described above. In order to compensate for this influence, a correction is performed as described in Embodiment 1 by using the voltage proportional to the output voltage Vout and the voltage proportional to the ON/OFF ratio D, whereby the current in the drooping characteristic can be made constant.

As described above, in the overcurrent protection circuit in accordance with Embodiment 2, the voltage proportional to the output voltage Vout generates across the first capacitor 49, and the voltage proportional to the ON/OFF ratio D generates across the second capacitor 53. For this reason, in the overcurrent protection circuit in accordance with Embodiment 2 shown in FIG. 4, a correction amount is calculated in consideration of the output voltage and the ON/OFF ratio D. As a result, the output current Iout can be made constant even in an overcurrent state.

Although Embodiment 2 is described by using a full-bridge converter as an example, effects similar to Embodiment 2 are obtained by an apparatus which comprises a smoothing circuit having components corresponding to the inductance device 43 and the smoothing capacitor 44 of Embodiment 2 and which produces an output voltage by averaging a rectangular wave voltage. Moreover, Embodiment 2 is described by a configuration of averaging applied voltages V2 and V4 shown in FIG. 4 to obtain a voltage proportional to the output voltage. The present invention is not limited to such a configuration. For example, a switching power supply may obtain a voltage proportional to the output voltage by adding an auxiliary winding to a transformer, rectifying the voltage generated across the auxiliary winding, and smoothing it by an inductance device and a smoothing capacitor. The voltage obtained by the above configuration is applied for correction.

Embodiment 3

Figure 6:
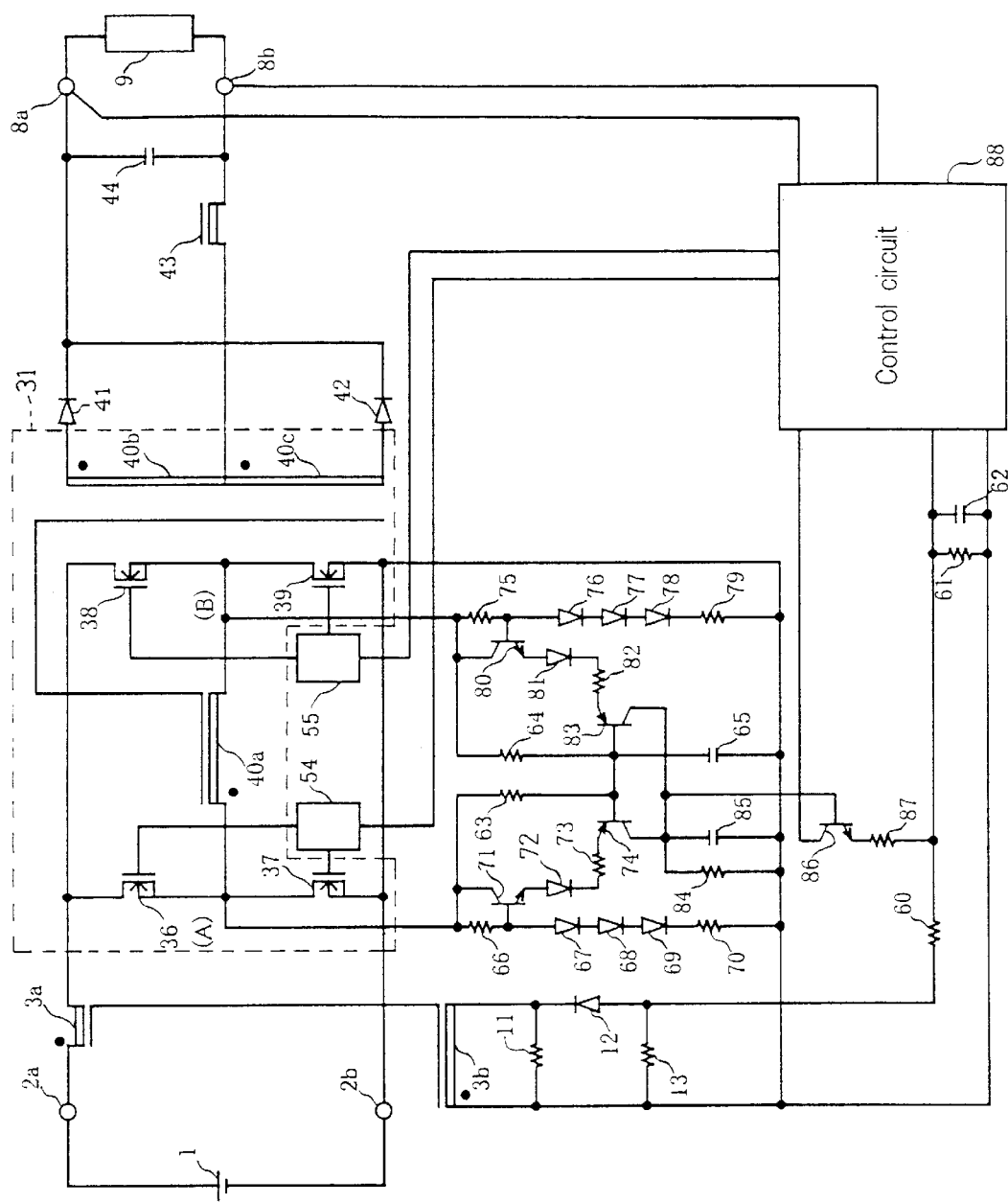
FIG. 6 is a circuit diagram showing a configuration of an overcurrent protection circuit of a switching power supply apparatus in accordance with Embodiment 3 of the present invention.

Next, an overcurrent protection circuit of a switching power supply apparatus in accordance with Embodiment 3 of the present invention will be described below referring to an accompanying drawing, FIG. 6. FIG. 6 is a circuit diagram showing a configuration of the overcurrent protection circuit of the switching power supply apparatus in accordance with Embodiment 3. In FIG. 6, the same components in terms of functions and configurations as those of the overcurrent protection circuit in accordance with Embodiment 1 described above are designated by the same numerals, and their explanations are omitted.

In FIG. 6, the input DC power source 1 is formed of a circuit for rectifying and smoothing a commercial power source or a battery, and connected across the input terminals 2a and 2b. The current transformer 3 has the primary winding 3a and the secondary winding 3b, and one terminal of the primary winding 3a is connected to one (2a) of the input terminals 2a and 2b. The other terminal of the primary winding 3a of the current transformer 3 is connected to the switching circuit 31 comprising the plurality of switching devices 36, 37, 38 and 39 and the insulating transformer 40.

The series circuit comprising the first switching device 36 and the second switching device 37 is connected to the input terminal 2a via the primary winding 3a of the current transformer 3, and configured so that the switching devices repeat ON/OFF operations alternately. The series circuit comprising the third switching device 38 and the fourth switching device 39 is connected to the input terminal 2a via the primary winding 3a of the current transformer 3, and configured so that the switching devices repeat ON/OFF operations alternately.

The insulating transformer 40 has the primary winding 40a, the first secondary winding 40b and the second secondary winding 40c. One terminal of the primary winding 40a is connected to the connection point (a first connection point) of the first switching device 36 and the second switching device 37. The other terminal of the primary winding 40a is connected to the connection point (a second connection point) of the third switching device 38 and the fourth switching device 39. The first secondary winding 40b and the second secondary winding 40c of the transformer 40 are connected in series. The anode of the first rectifying diode 41 is connected to the first secondary winding 40b of the transformer 40. The anode of the second rectifying diode 42 is connected to the second secondary winding 40c of the transformer 40. The cathode of the first rectifying diode 41 is directly connected to the cathode of the second rectifying diode 42.

The inductance device 43 and the smoothing capacitor 44 are connected in series. A smoothing circuit is formed of the series circuit of the inductance device 43 and the smoothing capacitor 44. One terminal of this smoothing circuit is connected to the connection point of the first secondary winding 40b and the second secondary winding 40c of the transformer 40. The other terminal of the smoothing circuit is connected to the connection point of the first rectifying diode 41 and the second rectifying diode 42. The smoothing capacitor 44 is connected across the output terminals 8a and 8b so that the voltage across the smoothing capacitor 44 is output. The load 9 is connected across the output terminals 8a and 8b, and consumes the power from the overcurrent protection circuit of the switching power supply apparatus.

As described above, the switching power supply apparatus in accordance with Embodiment 3 uses the insulating transformer 40 and is formed of a full-bridge converter having a plurality of switching devices.

The first resistor 11 is connected in parallel with the secondary winding 3b of the current transformer 3. The diode 12 rectifies a current induced at the secondary winding 3b of the current transformer 3, and a voltage proportional to a current flowing through the primary winding 3a of the current transformer 3 generates across the second resistor 13.

The configuration in accordance with Embodiment 3 described above is substantially identical to the configuration of the overcurrent protection circuit of the switching power supply apparatus in accordance with Embodiment 2 described above.

A series circuit comprising a third resistor 60 and a fourth resistor 61 is connected across the second resistor 13, thereby dividing a voltage generating across the second resistor 13. A first capacitor 62 is connected in parallel with the fourth resistor 61, thereby absorbing a spike voltage generating across the second resistor 13.

One terminal of a fifth resistor 63 is connected to the first connection point, and one terminal of a sixth resistor 64 is connected to the second connection point. The other terminals of the resistors 63 and 64 are connected to each other. Voltages at the first and second connection points are averaged by the fifth resistor 63, the sixth resistor 64 and a second capacitor 65. Hence, a voltage NVout/2 proportional to the output voltage Vout generates across the second capacitor 65.

One terminal of a seventh resistor 66 is connected to the first connection point, and the other terminal of the seventh resistor 66 is connected to a second diode 67. Furthermore, the second diode 67, a third diode 68, a fourth diode 69 and an eighth resistor 70 are connected in series. When the first switching device 36 is ON, the input voltage Vin generating at the first connection point is divided by the seventh resistor 66 and the eighth resistor 70. The second, third and fourth diodes 67, 68 and 69 are provided to correct the forward voltages of transistors and diodes described later.

A first transistor 71 outputs the voltage divided by the seventh resistor 66 and the eighth resistor 70 at low impedance. When the first switching device 36 is OFF, a fifth diode 72 connected to the emitter of the first transistor 71 is reverse-biased and prevents the backflow of current. A ninth resistor 73 connected to the cathode of the fifth diode 72 is connected to the emitter of a second transistor 74. When the first switching device 36 is ON, the difference voltage between the divided voltage and the voltage (NVout/2) proportional to the output voltage is converted into a current by the ninth resistor 73. The current is output from the collector of the second transistor 74.

A voltage drop at each of the second to fifth diodes 67, 68, 69 and 72 is equal to the forward-biased base-emitter voltage of the first transistor 71, and the forward-biased base-emitter voltage of the second transistor 74. It is assumed that the voltage is Vpn and that the current amplification degrees of the first transistor 71 and the second transistor 74 are sufficiently large. Under these assumptions, the base voltage of the first transistor 71 becomes (Vin/2+ 3Vpn), and a voltage applied to the ninth resistor 73 becomes (Vin/2−NVout/2), since Vpn is canceled. Hence, only when the first switching device 36 is ON, a current {(Vin−NVout)/2Rx} flows through the collector of the second transistor 74. The resistance value of the ninth resistor 73 is herein assumed to be Rx.

A circuit configuration similar to that described above is also connected to the second connection point. A 10th resistor 75 is connected to the second connection point. A sixth diode 76, a seventh diode 77, an eighth diode 78, and an 11th resistor 79 are connected in series with the 10th resistor 75. A ninth diode 81 is connected to the emitter of a third transistor 80. The cathode of the ninth diode 81 is connected to the emitter of a fourth transistor 83 via a 12th resistor 82. When the third switching device 38 is ON, the current {(Vin−NVout)/2Rx} flows through the collector of the fourth transistor 83 in a way similar to that described above. However, it is herein assumed that the resistance value of the 12th resistor 82 is the same as that of the ninth resistor 73, that is, Rx.

A 13th resistor 84 and a third capacitor 85, which are connected to the collectors of the second transistor 74 and the fourth transistor 83, add and average the collector currents of the second transistor 74 and the fourth transistor 83. A voltage {D·Ry(Vin−NVout)/2Rx} depending on the duty ratio D in the ON periods of the first switching device 36 and the third switching device 38 can be obtained by averaging the collector currents as described above. Ry herein designates the resistance value of the 13th resistor 84.

A current proportional to the voltage {D·Ry(Vin−NVout)/ 2Rx} obtained as described above is generated by a fifth transistor 86 and a 14th resistor 87 and is used to correct a current signal generated at the second resistor 13.

As shown in FIG. 6, the overcurrent protection circuit of the switching power supply apparatus in accordance with Embodiment 3 is provided with a control circuit 88. The control circuit 88 outputs PWM signals to the first drive circuit 54 and the second drive circuit 55 so that the output voltage across the output terminals 8a and 8b becomes constant during ordinary operation. When the voltage across the output terminals 8a and 8b becomes a certain voltage or more, the control circuit 88 drives the first drive circuit 54 and the second drive circuit 55 to turn OFF the first to fourth switching devices 36, 37, 38 and 39.

The first drive circuit 54 controls the ON/OFF operation of the first switching device 36 depending on the PWM signal of the control circuit 88. Furthermore, the first drive circuit 54 controls the ON/OFF operation of the second switching device 37 so that the second switching device 37 turns OFF/ON complementarily to the ON/OFF operation of the first switching device 36. The second drive circuit 55 controls the ON/OFF operation of the third switching device 38 depending on the ON/OFF ratio of the control circuit 88. Furthermore, the second drive circuit 55 controls the ON/OFF operation of the fourth switching device 39 so that the fourth switching device 39 turns OFF/ON complementarily to the ON/OFF operation of the third switching device 38.

In the overcurrent protection circuit of the switching power supply apparatus in accordance with Embodiment 3 described above, a detected peak current value can be corrected by a current value proportional to the voltage {D·Ry(Vin−NVout)/2Rx} depending on the duty ratio D. Hence, it is possible to obtain effects similar to those of Embodiments 1 and 2 described above.

Embodiment 4

Figure 7:
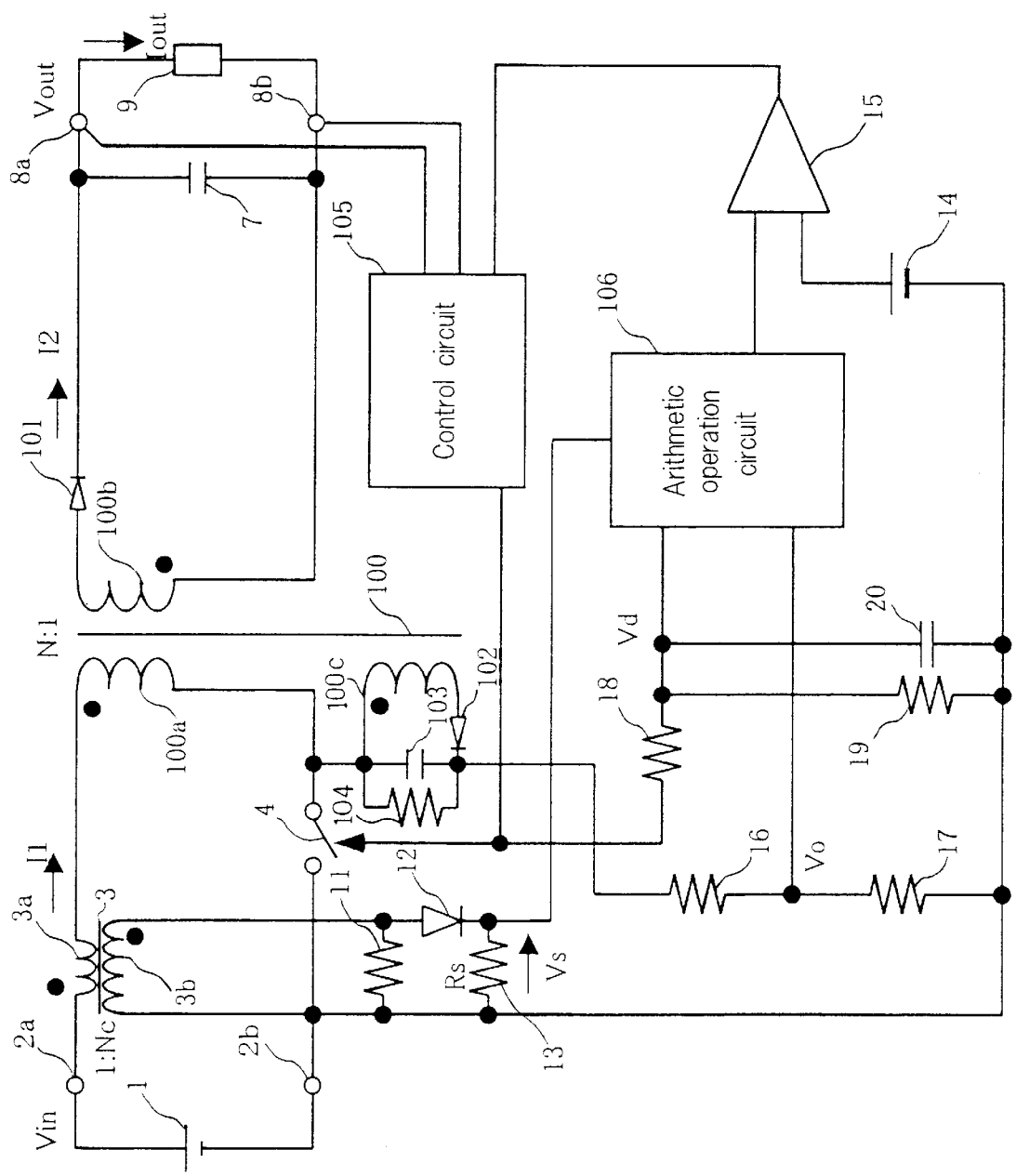
FIG. 7 is a circuit diagram showing a configuration of an overcurrent protection circuit of a switching power supply apparatus in accordance with Embodiment 4 of the present invention.

An overcurrent protection circuit of a switching power supply apparatus in accordance with Embodiment 4 of the present invention will be described below referring to an accompanying drawing, FIG. 7. FIG. 7 is a circuit diagram showing a configuration of the overcurrent protection circuit of the switching power supply apparatus in accordance with Embodiment 4. In FIG. 7, the same components in terms of functions and configurations as those of the overcurrent protection circuit in accordance with Embodiment 1 described above are designated by the same numerals, and their explanations are omitted.

The overcurrent protection circuit of the switching power supply apparatus in accordance with Embodiment 4 differs from the above-mentioned overcurrent protection circuit in accordance with Embodiment 1 shown in FIG. 1 in that the basic circuit configuration of Embodiment 4 is an insulating flyback converter. The overcurrent protection circuit also differs in the method of detecting the output voltage and in the method of correction.

Figure 8:
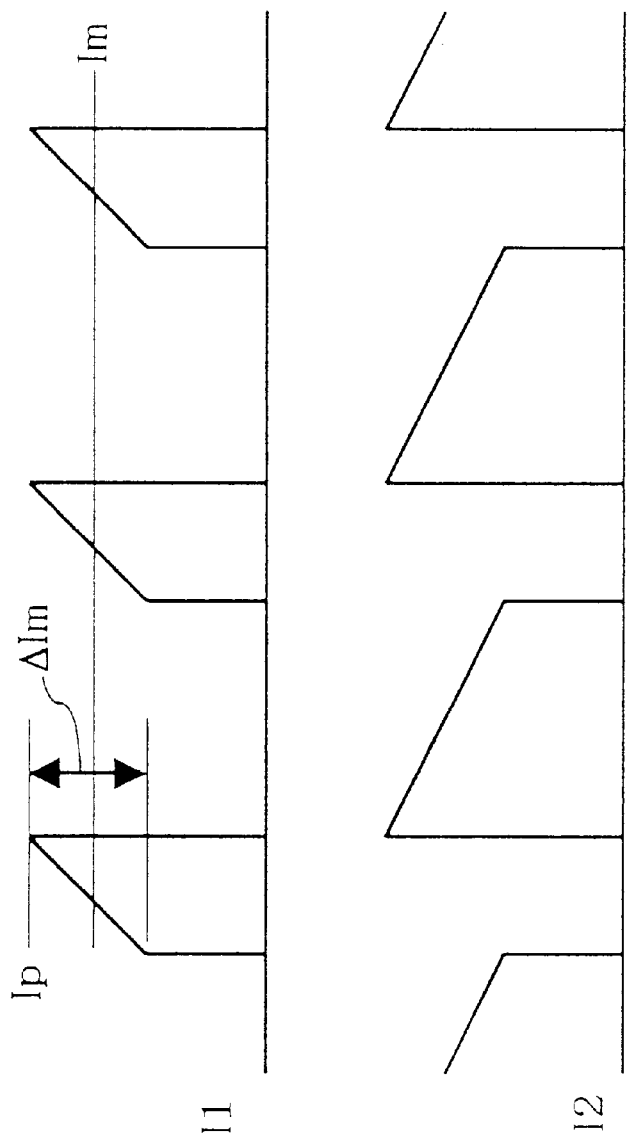
FIG. 8 is a waveform diagram showing the operation of the overcurrent protection circuit in accordance with Embodiment 4.

In FIG. 7, the input DC power source 1 is formed of a circuit for rectifying and smoothing a commercial power source or a battery, and connected across the input terminals 2a and 2b. The current transformer 3 has the primary winding 3a and the secondary winding 3b, and one terminal of the primary winding 3a is connected to one (2a) of the input terminals 2a and 2b. The other terminal of the primary winding 3a of the current transformer 3 is connected to one terminal of the primary winding 100a of a transformer 100. The transformer 100 has the primary winding 100a, a secondary winding 100b and an auxiliary winding 100c. The other terminal of the primary winding 100a is connected to the other input terminal 2b via the switching terminal 4. A series circuit comprising a first rectifying diode 101 and the smoothing capacitor 7 is connected to the secondary winding 100b of the transformer 100. The smoothing capacitor 7 is connected across the output terminals 8a and 8b. FIG. 8 shows waveforms of current I1 flowing in the primary winding 100a of the transformer 100 and current I2 flowing in the secondary winding 100b.

When the switching terminal 4 is ON, the input voltage Vin is applied to the primary winding 100a of the transformer 100 via the primary winding 3a of the current transformer 3, and exciting energy is stored. When the switching terminal 4 is OFF, the stored exciting energy is discharged at the smoothing capacitor 7 via the secondary winding 100b of the transformer 100 and the rectifying diode 101. At this time, the voltage generating across the primary winding 3a of the current transformer 3 is set so as to be sufficiently low as explained above in the descriptions of Embodiment 1.

The smoothing capacitor 7 is connected across the output terminals 8a and 8b so that the voltage across the smoothing capacitor 7 is output. The load 9 is connected across the output terminals 208a and 208b, and consumes the power from the overcurrent protection circuit of the switching power supply apparatus.

The first resistor 11 is connected in parallel with the secondary winding 3b of the current transformer 3. The diode 12 rectifies a current induced at the secondary winding 3b of the current transformer 3. A voltage proportional to a current flowing through the primary winding 3a of the current transformer 3 is generated across the second resistor 13.

The second resistor 13 is connected to a corrected voltage generation circuit comprising the third resistor 16, the fourth resistor 17, the fifth resistor 18, the sixth resistor 19, the capacitor 20 and an arithmetic operation circuit 106. Furthermore, this corrected voltage generation circuit is connected to the comparator 15 and the reference power source 14.

A second rectifying diode 102, a second smoothing capacitor 103 and a second load 104 are connected to the auxiliary winding 100c of the transformer 100. When the switching device 4 is OFF, a voltage generating across the auxiliary winding 100c of the transformer 100 is stored in the second smoothing capacitor 103 via the second rectifying diode 102. The second load 104 simulates power consumption at a control circuit 105, for example. The control circuit 105 is connected to the output terminals 8a and 8b, and controls the ON/OFF operation of the switching device 4 by detecting the output state.

In the overcurrent protection circuit configured as described above, when the rectifying diode 101 is ON, the output voltage Vout is applied to the secondary winding 100b of the transformer 100. Hence, a voltage proportional to the output voltage Vout generates across the auxiliary winding 100c of the transformer 100. The second smoothing capacitor 103 is thus charged, whereby a voltage generating across the second smoothing capacitor 103 becomes proportional to the output voltage Vout. As a result, the voltage generating across the second smoothing capacitor 103 is divided by the third resistor 16 and the fourth resistor 17, thereby forming the voltage Vo proportional to the output voltage Vout.

In the corrected voltage generation circuit shown in FIG. 7, the arithmetic operation circuit 106 converts the voltage Vs generating across the second resistor 13. This conversion is carried out by using the voltage Vo proportional to the output voltage Vout and the voltage Vd proportional to the duty ratio D on the basis of a theory as described later. The output signal of the arithmetic operation circuit 106 is input to the comparator 15 so that the peak value of the converted voltage becomes constant.

In an ordinary state, the control circuit 105 determines the ON/OFF ratio of the switching device 4 to stabilize the voltage across the output terminals 8a and 8b, and outputs an ON/OFF signal to the switching device 4. At the time of overcurrent, the control circuit 105 generates an ON/OFF signal depending on the output from the comparator 15 and output the ON/OFF signal to the switching device 4.

Next, the operation of the overcurrent protection circuit in accordance with Embodiment 4 configured as described above will be described below.

The relationship between the peak value Ip of the current flowing through the switching device 4 and the output current Iout is derived first. The output current Iout is given by the average value Im of the exciting current of the transformer 100 at the time when the rectifying diode 101 is ON, and represented by the following equation (11).

$$I_{out} = (1-D)I_m \qquad (11)$$

In other words, the average value Im is represented by the following equation (12).

$$I_m = \frac{I_{out}}{(1-D)} \quad (12)$$

The fluctuation width ΔIm of the exciting current of the transformer 100 is represented by the following equation (13). In Equation (13), Vin designates the input voltage, Ton designates the ON period of the switching device 4, and Lm designates the inductance value of the transformer 100.

$$\Delta I_m = \frac{V_{in} T_{on}}{L_m} \quad (13)$$

Hence, the peak value of the exciting current, that is, the peak value Ip of the current flowing through the switching device 4, is represented by the following equation (14).

$$I_p = I_m + \frac{\Delta I_m}{2} = \frac{I_{out}}{(1-D)} + \frac{V_{in} T_{on}}{2L_m} \quad (14)$$

Hence, the output current Iout is represented by the following equation (15).

$$I_{out} = (1-D)I_p + (1-D)\frac{V_{in}T_{on}}{2L_m} \quad (15)$$
$$= (1-D)\left(I_p + \frac{V_{in}D}{2L_m T_s}\right) = (1-D)\left(I_p + \frac{V_{out}(1-D)}{2L_m T_s}\right)$$

However, the input/output conversion ratio of the flyback converter is represented by the following equation (16).

$$NV_{out} = \frac{D}{(1-D)} V_{in} \quad (16)$$

Hence, an overcurrent protection circuit having a constant current characteristic can be configured by changing the reference voltage in accordance with Equation (14) or by performing the operation represented by Equation (15) for the detected waveform of the switching current and by restricting the switching current so that its peak value becomes constant.

In the correction method of the overcurrent protection circuit in accordance with Embodiment 4, the input voltage is applied to a magnetic component (the transformer 100) in the ON period Ton of the switching device 4, energy is stored, and the energy is delivered from the magnetic component in the OFF period Toff. In this configuration, correction is made possible by the correction equation represented by Equation (15).

The overcurrent protection circuit of the switching power supply apparatus in accordance with Embodiment 4 configured as described above can properly correct the peak value Ip of the detected current. It is thus possible to obtain effects similar to those of Embodiments 1, 2 and 3 described above.

Embodiment 5

Figure 9:
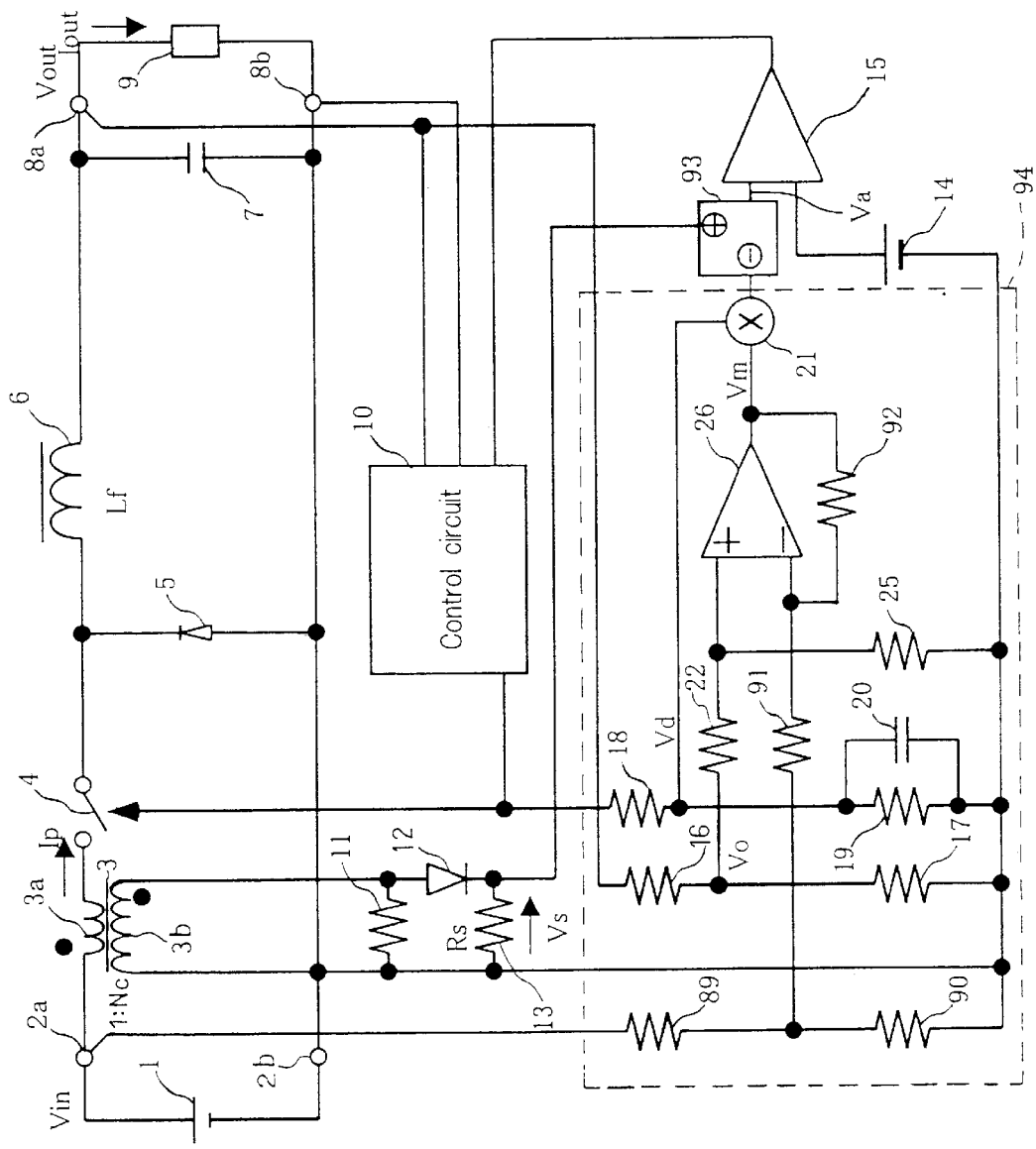
FIG. 9 is a circuit diagram showing a configuration of an overcurrent protection circuit of a switching power supply apparatus in accordance with Embodiment 5 of the present invention.

Next, an overcurrent protection circuit of a switching power supply apparatus in accordance with Embodiment 5 of the present invention will be described below referring to an accompanying drawing, FIG. 9. FIG. 9 is a circuit diagram showing a configuration of the overcurrent protection circuit of the switching power supply apparatus in accordance with Embodiment 5. In FIG. 9, the same components in terms of functions and configurations as those of the overcurrent protection circuit in accordance with Embodiment 1 described above are designated by the same numerals, and their explanations are omitted.

The overcurrent protection circuit of the switching power supply apparatus in accordance with Embodiment 5 differs from the overcurrent protection circuit in accordance with Embodiment 1 shown in FIG. 1 in the configuration of a circuit for performing correction, since Embodiment 5 uses a different correction equation.

In FIG. 9, the input DC power source 1 is formed of a circuit for rectifying and smoothing a commercial power source or a battery. This input DC power source 1 is connected across the input terminals 2a and 2b. Th current transformer 3 has the primary winding 3a and the secondary winding 3b, and one terminal of the primary winding 3a is connected to one (2a) of the input terminals 2a and 2b. The other terminal of the primary winding 3a of the current transformer 3 is connected to one terminal of the switching device 4. The other terminal of the switching device 4 is connected to the cathode of the rectifying diode 5 and one terminal of the inductance device 6. The switching device 4 connected in this way is turned ON/OFF repeatedly by a control signal from the control circuit 10 described later. The anode of the rectifying diode 5 is connected to the other input terminal 2b.

As shown in FIG. 9, the inductance device 6 and the smoothing capacitor 7 are connected in series, thereby forming a series circuit. This series circuit is connected across the rectifying diode 5, thereby forming a smoothing circuit. This smoothing circuit averages a rectangular wave voltage generating across the rectifying diode 5, thereby forming a DC voltage.

A voltage averaged by the smoothing capacitor 7 is output across the output terminals 8a and 8b of the overcurrent protection circuit of the switching power supply apparatus in accordance with Embodiment 5 shown in FIG. 9. The load 9 is connected across the output terminals 8a and 8b, and consumes the power from the overcurrent protection circuit of the switching power supply apparatus.

The control circuit 10 detects a voltage across the output terminals 8a and 8b, and outputs a control signal for controlling the ON/OFF ratio of the switching device 4 so that a stabilized voltage is output. The first resistor 11 is connected in parallel with the secondary winding 3b of the current transformer 3. In the OFF period of the switching device 4, an exciting current flows through the secondary winding 3b of the current transformer 3, whereby the exciting energy of the current transformer 3 is consumed.

The diode 12 rectifies a current induced at the secondary winding 3b of the current transformer 3. The second resistor 13 generates a voltage proportional to a current flowing through the primary winding 3a of the current transformer 3 in real time.

When the switching device 4 is ON, a current flowing through the primary winding 3a of the current transformer 3 is converted into a current corresponding to the winding ratio of the current transformer 3, and flows through the second resistor 13 via the diode 12. Hence, the voltage Vs proportional to the current flowing through the primary winding 3a of the current transformer 3 generates across the second resistor 13.

The voltage Vs generating across the second resistor 13 is added to a voltage from a corrected voltage generation circuit 94 described later, and input to one terminal of the comparator 15. The reference voltage from the reference power source 14 is input to the other terminal of the comparator 15. The voltage corrected by the corrected voltage generation circuit 94 is compared with the reference voltage by the comparator 15. When the corrected voltage reaches the reference voltage, the switching device 4 is turned OFF via the control circuit 10.

Next, the configuration of the corrected voltage generation circuit 94 in accordance with Embodiment 5 will be described below.

In the corrected voltage generation circuit 94, the output voltage Vout is divided by the third resistor 16 and the fourth resistor 17, thereby forming the voltage Vo. In addition, the control signal of the control circuit 10, that is, an ON/OFF signal, is averaged by the fifth resistor 18, the sixth resistor 19 and the capacitor 20, thereby forming the voltage Vd proportional to the ON/OFF ratio (duty ratio) D.

Furthermore, the input voltage Vin is divided by a ninth resistor 89 and a 10th resistor 90, thereby forming a voltage Vi.

Still further, a seventh resistor 22, an eighth resistor 25, an 11th resistor 91, a 12th resistor 92 and the operational amplifier 26 constitute a differential amplifier circuit, and the differential amplifier circuit generates a voltage (Vi−Vo).

The voltage Vd and the voltage (Vi−Vo) output from the differential amplifier circuit are input to the multiplier 21, and the product {Vd×(Vi−Vo)} is calculated.

An adder 93 calculates the sum of the voltage Vs generating across the second resistor 13 and the inverted signal of a voltage output from the multiplier 21, and outputs the sum to the comparator 15. The output of the adder 93 and the reference voltage Vr of the reference power source 14 are input to the comparator 15. The comparator 15 compares the voltage Va with the reference voltage Vr, thereby determining the turning OFF timing of the switching device 4.

Next, the operation of the overcurrent protection circuit of the switching power supply apparatus in accordance with Embodiment 5 configured as described above will be described below.

Since the operation of converting the input voltage Vin into the output voltage Vout by the ON/OFF operation of the switching device 4 is the same as that in the switching power supply apparatus in accordance with Embodiment 1, the explanation of the operation is omitted. A current flowing through the switching device 4 can be detected in real time by the voltage across the second resistor 13.

At this time, the relationship between the output current Iout and the peak current Ip of the switching current is represented by Equation (7) as explained above in the descriptions of Embodiment 1. When Equation (5) is used herein, it is understood that Equation (7) is equivalent to the following equation (17).

$$I_{out} = I_p - \frac{V_{out}(1-D)T_s}{2L_f} = I_p - \left(\frac{T_s}{2L_f}\right)(V_{in} - V_{out})D \quad (17)$$

In other words, it is understood that the output voltage is obtained by adding the reference voltage Vr to a corrected voltage corresponding to a corrected current obtained by the correction function at the second term of Equation (17). Or, it is understood that the output voltage is obtained by having the difference between the voltage Vs proportional to an actually detected current waveform and a corrected voltage corresponding to the value of the corrected current at the second term of Equation (17).

It is understood that a corrected signal obtained by the corrected voltage generation circuit 94 in the overcurrent protection circuit shown in FIG. 9 designates a corrected value represented at the second term of Equation (17), and that a necessary corrected amount can be obtained. Even when the corrected amount is calculated by using the circuit configuration described above, the corrected amount obtained by Equation (17) becomes intrinsically identical to the corrected amount obtained by Equation (6). It is thus possible to obtain effects similar to those of Embodiment 1.

Although Embodiment 5 is described by using a stepdown converter as an example, the present invention may be configured with an insulating converter such as a forward converter represented by the full-bridge converter explained in the Embodiment 2. In other words, the present invention may be configured to comprise a smoothing circuit having components corresponding to the inductance device and the smoothing capacitor, and which produces an output voltage by averaging a rectangular wave voltage. Therefore, in this switching power supply, it is possible to correct by taking a term corresponding to Vout as (N×Vout) by using the correction equation when a winding ratio of the transformer is N. Such a configuration obtains effects similar to Embodiment 5.

Embodiment 6

Figure 10:
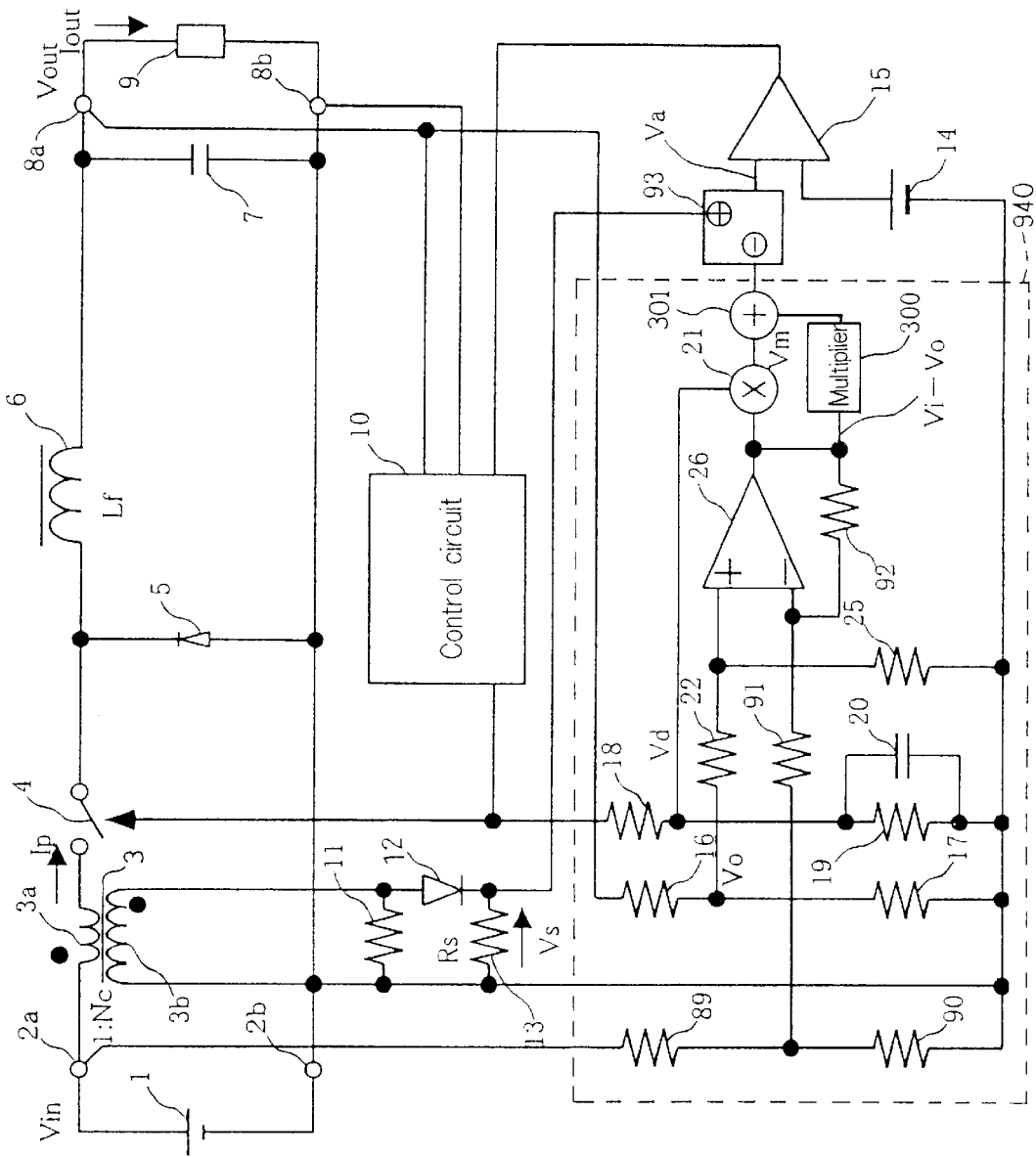
FIG. 10 is a circuit diagram showing another configuration of the overcurrent protection circuit of the switching power supply apparatus in accordance with Embodiment 5 of the present invention.

Next, an overcurrent protection circuit of a switching power supply apparatus in accordance with Embodiment 6 of the present invention will be described below referring to an accompanying drawing, FIG. 10. FIG. 10 is a circuit diagram showing a configuration of the overcurrent protection circuit of the switching power supply apparatus in accordance with Embodiment 6. In FIG. 10, the same components in terms of functions and configurations as those of the overcurrent protection circuit in accordance with Embodiment 1 described above are designated by the same numerals, and their explanations are omitted.

The overcurrent protection circuit of the switching power supply apparatus in accordance with Embodiment 6 differs from the overcurrent protection circuit in accordance with Embodiment 1 shown in FIG. 1 in the configuration of a circuit for performing correction, since Embodiment 6 uses a different correction equation.

In FIG. 10, the input DC power source 1 is formed of a circuit for rectifying and smoothing a commercial power source or a battery. This input DC power source 1 is connected across the input terminals 2a and 2b. The current transformer 3 has the primary winding 3a and the secondary winding 3b, and one terminal of the primary winding 3a is connected to one (2a) of the input terminals 2a and 2b. The other terminal of the primary winding 3a of the current transformer 3 is connected to one terminal of the switching device 4. The other terminal of the switching device 4 is connected to the cathode of the rectifying diode 5 and one terminal of the inductance device 6. The switching device 4 connected in this way is turned ON/OFF repeatedly by a control signal from the control circuit 10 described later. The anode of the rectifying diode 5 is connected to the other input terminal 2b.

As shown in FIG. 10, the inductance device 6 and the smoothing capacitor 7 are connected in series, thereby forming a series circuit. This series circuit is connected across the rectifying diode 5, thereby forming a smoothing circuit. This smoothing circuit averages a rectangular wave voltage generating across the rectifying diode 5, thereby forming a DC voltage.

A voltage averaged by the smoothing capacitor 7 is output across the output terminals 8a and 8b of the overcurrent protection circuit of the switching power supply apparatus in accordance with Embodiment 6 shown in FIG. 10. The load 9 is connected across the output terminals 8a and 8b, and consumes the power from the overcurrent protection circuit of the switching power supply apparatus.

The control circuit 10 detects the voltage across the output terminals 8a and 8b, and outputs a control signal for controlling the ON/OFF ratio of the switching device 4 so that a stabilized voltage is output. The first resistor 11 is connected in parallel with the secondary winding 3b of the current transformer 3. In the OFF period of the switching device 4, an exciting current flows through the secondary winding 3b of the current transformer 3, whereby the exciting energy of the current transformer 3 is consumed.

The diode 12 rectifies a current induced on the secondary winding 3b of the current transformer 3. The second resistor 13 generates a voltage proportional to a current flowing through the primary winding 3a of the current transformer 3 in real time.

When the switching device 4 is ON, the current flowing through the primary winding 3a of the current transformer 3 is converted into a current corresponding to the winding ratio of the current transformer 3, and flows through the second resistor 13 via the diode 12. Hence, the voltage Vs proportional to the current flowing through the primary winding 3a of the current transformer 3 generates across the second resistor 13.

The difference between the voltage Vs generating across the second resistor 13 and a voltage from a corrected voltage generation circuit 95 described later is calculated and is input to one terminal of the comparator 15. The reference voltage from the reference power source 14 is input to the other terminal of the comparator 15. The voltage corrected by the corrected voltage generation circuit 95 is compared with the reference voltage by the comparator 15. When the corrected voltage reaches the reference voltage, the switching device 4 is turned OFF via the control circuit 10.

Next, the configuration of the corrected voltage generation circuit 95 in accordance with Embodiment 6 will be described below.

The corrected voltage generation circuit 95 in accordance with Embodiment 6 is basically the same as the corrected voltage generation circuit in accordance with Embodiment 1 described above. In the corrected voltage generation circuit 95, the output voltage Vout is divided by the third resistor 16 and the fourth resistor 17, thereby forming the voltage Vo. In addition, the control signal of the control circuit 10, that is, an ON/OFF signal, is averaged by the fifth resistor 18, the sixth resistor 19 and the capacitor 20, thereby forming the voltage Vd proportional to the ON/OFF ratio (duty ratio) D. When an 11th resistor 89 and a 12th resistor 90 are eliminated in FIG. 10, the corrected voltage generation circuit is the same as that shown in FIG. 1. Hence, the correction signal represented by Equation (7) is formed by the corrected voltage generation circuit 95.

In Embodiment 6, the input voltage Vin is divided by the 11th resistor 89 and the 12th resistor 90, thereby forming the voltage Vi.

Furthermore, by adjusting the resistance value of a ninth resistor 24, Vi and Vo are applied to the operational amplifier 26, whereby a signal proportional to the voltage (Vi–Vo) can be applied.

Next, the operation of the overcurrent protection circuit of the switching power supply apparatus in accordance with Embodiment 6 configured as described above will be described below.

Since the operation of converting the input voltage Vin into the output voltage Vout by the ON/OFF operation of the switching device 4 is the same as that in the switching power supply apparatus in accordance with Embodiment 1, the explanation of the operation is omitted herein. The current flowing through the switching device can be detected in real time by the voltage across the second resistor 13, just as in the case of Embodiment 1.

At this time, the peak current of the switching current is represented by the second term of Equation (6) as explained in the descriptions of Embodiment 1.

In each of the embodiments, it is explained that the delay times of the comparator 15, the control circuit 10 and the switching device 4 are sufficiently smaller than the switching cycle and thus negligible. However, when the delay times are not negligible, even when the corrected current signal reaches the reference voltage, the current flowing through the switching device 4 cannot be turned OFF instantaneously. Hence, the peak value of the switching current increases by $\{Td \times (Vin-Vout)/Lf\}$ depending on a delay time Td. In Embodiment 6, to cope with this increase in the peak voltage, the level of the overcurrent is lowered by increasing a correction amount in advance by the increase amount of the current. In other words, the input voltage Vin is applied to the positive input terminal of the operational amplifier 26 via a resistor, and the output voltage Vout is applied to the negative input terminal via a resistor at the same time. Hence, it is possible to obtain a correction amount proportional to the value (Vin–Vout). As a result, the overcurrent-restricting characteristic can be made constant, even when a certain delay time is taken into consideration.

FIG. 10 is a circuit diagram showing another configuration of the overcurrent protection circuit of the switching power supply apparatus in accordance with Embodiment 6 of the present invention. In a corrected voltage generation circuit 940 in the overcurrent protection circuit of the switching power supply apparatus, a multiplier 300 and an adder 301 are provided at the output of the operational amplifier 26.

Figure 11:
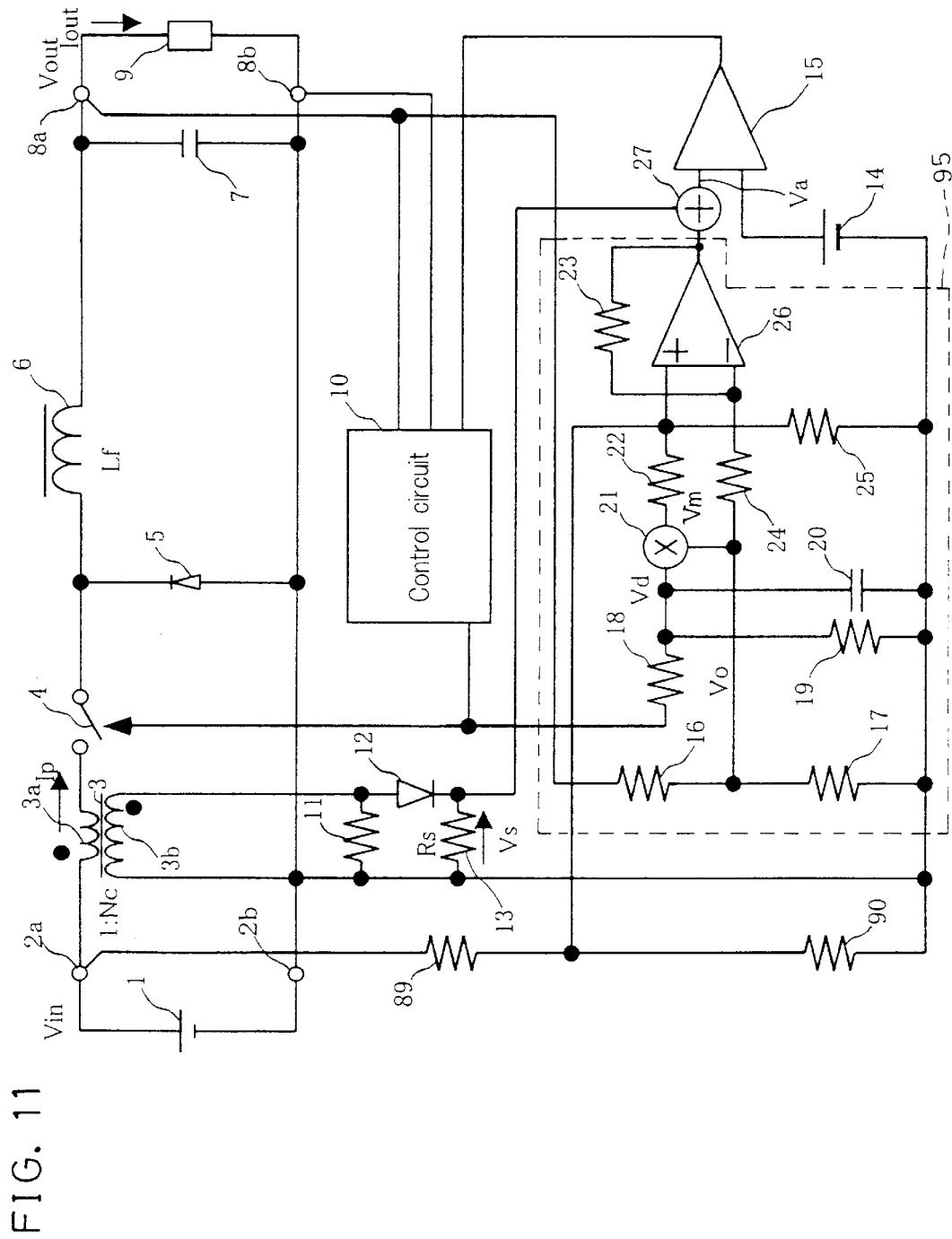
FIG. 11 is a circuit diagram showing a configuration of an overcurrent protection circuit of a switching power supply apparatus in accordance with Embodiment 6 of the present invention.
Figure 12:
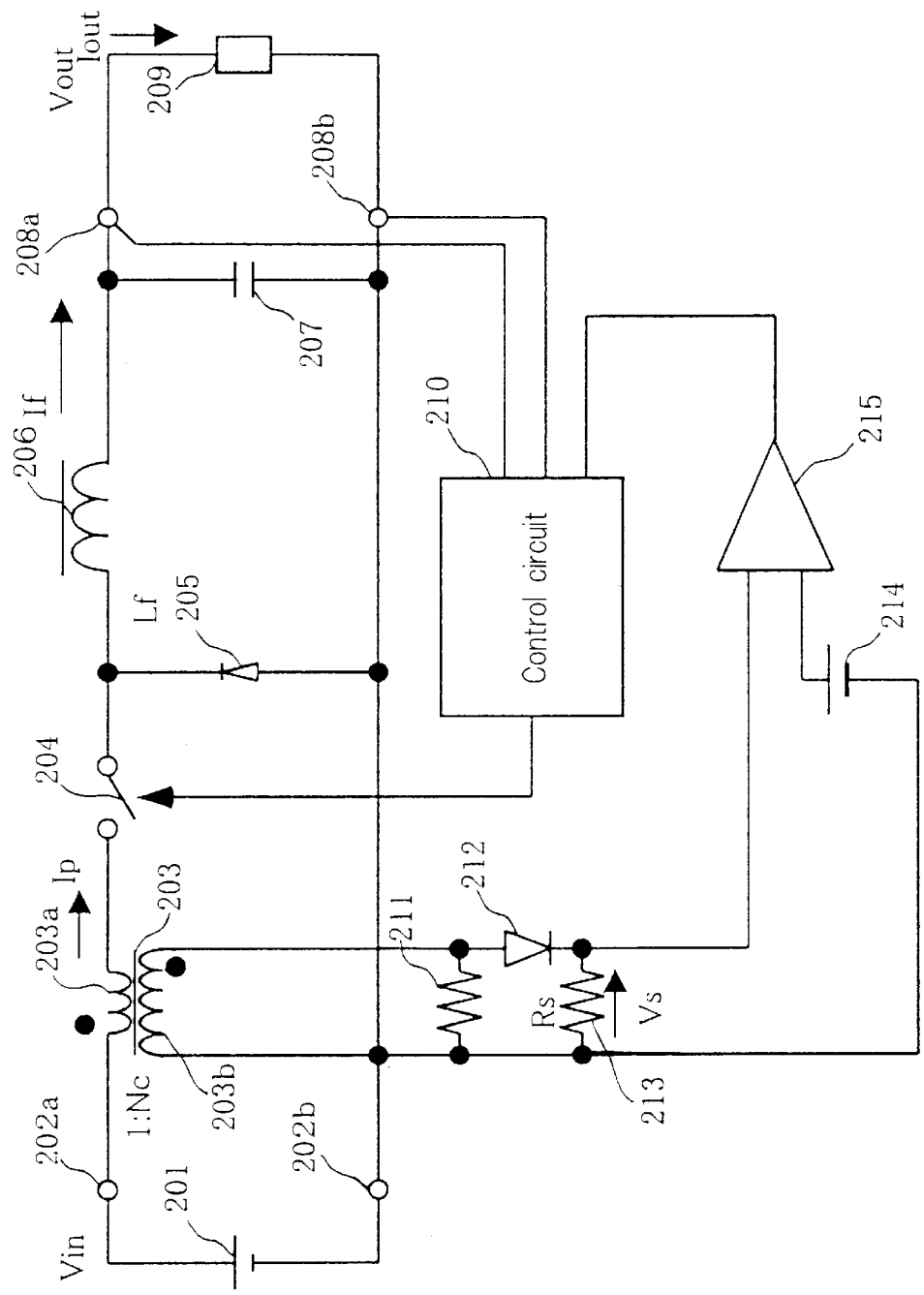
FIG. 12 is the circuit diagram showing the conventional overcurrent protection circuit of the switching power supply apparatus.
Figure 13:
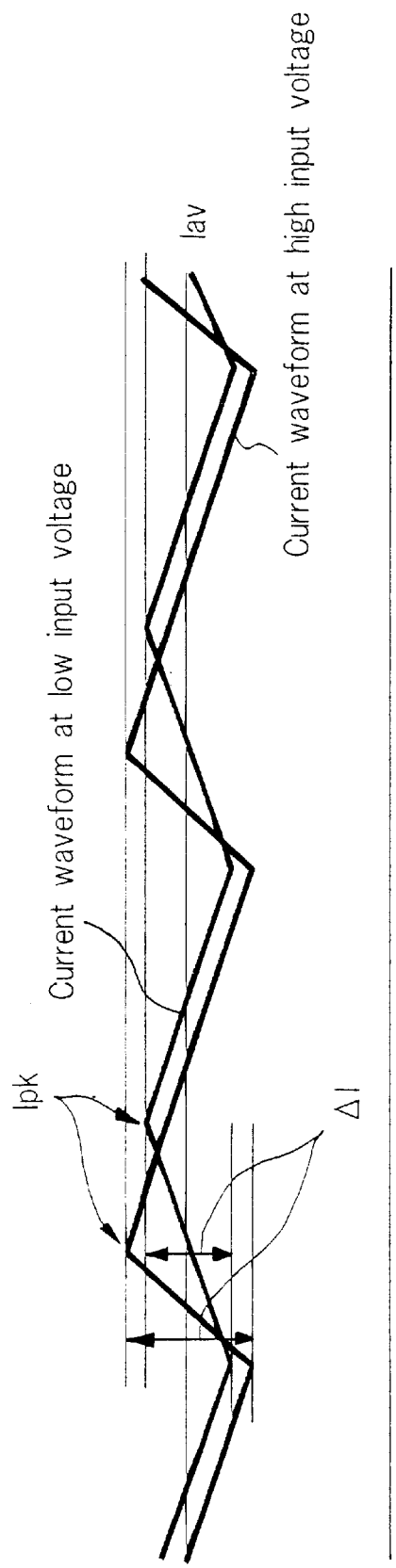
FIG. 13 is the waveform diagram showing the operation of the conventional overcurrent protection circuit of the switching power supply apparatus.
Figure 14:
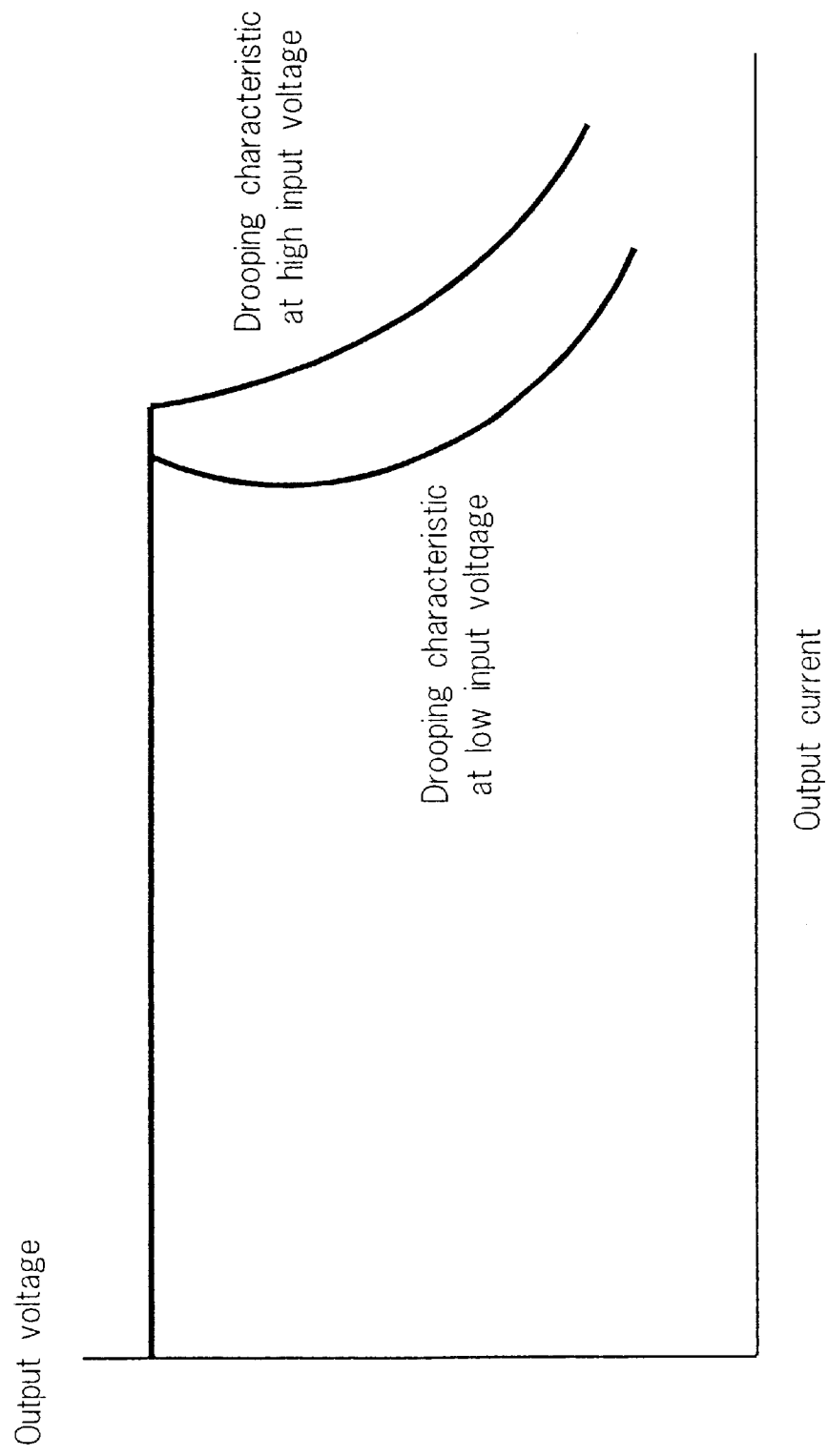
FIG. 14 is the graph showing the overcurrent drooping characteristic of the conventional overcurrent protection circuit of the switching power supply apparatus.

The configuration of the corrected voltage generation circuit 940 shown in FIG. 11 will be described below.

In the corrected voltage generation circuit 940, the output voltage Vout is divided by the third resistor 16 and the fourth resistor 17, just as in the case of the corrected voltage generation circuit 95 shown in FIG. 10, thereby forming the voltage Vo. In addition, the control signal of the control circuit 10, that is, an ON/OFF signal, is averaged by the fifth resistor 18, the sixth resistor 19 and the capacitor 20, thereby forming the voltage Vd proportional to the ON/OFF ratio (duty ratio) D.

Furthermore, the input voltage Vin is divided by the ninth resistor 89 and the 10th resistor 90, thereby forming the voltage Vi. The seventh resistor 22, the eighth resistor 25, the 11th resistor 91, the 12th resistor 92 and the operational amplifier 26 constitute a differential amplifier circuit, and the differential amplifier circuit generates the voltage (Vi–Vo).

The voltage Vd and the voltage (Vi–Vo) output from the differential amplifier circuit are input to the multiplier 21, and the product $\{Vd \times (Vi-Vo)\}$ is calculated. Furthermore, the output voltage (Vi–Vo) of the differential amplifier circuit is input to the multiplier 300, multiplied by a constant, and output to the adder 301. $\{Vd \times (Vi-Vo)\}$ is input from the multiplier 21 to the adder 301 and added to (Vi–Vo).

The adder 93 calculates the sum (voltage Va) of the voltage Vs generating across the second resistor 13 and the inverted signal of the voltage output from the adder 301, and outputs the sum to the comparator 15. The output of the adder 93 and the reference voltage Vr of the reference power source 14 are input to the comparator 15. The comparator 15 compares the voltage Va with the reference voltage Vr, thereby determining the turning OFF timing of the switching device 4.

In the overcurrent protection circuit of the switching power supply apparatus configured as described above and shown in FIG. 11, the operation of converting the input voltage Vin into the output voltage Vout by the ON/OFF operation of the switching device 4 is the same as that in the switching power supply apparatus in accordance with Embodiment 1. Hence, even in this embodiment, when the overcurrent protection circuit operates owing to changes in the input voltage Vin and the output voltage Vout, the output voltage does not increase but is controlled so as to be constant.

Moreover, as described in the Embodiment 5, the switching power supply apparatus of Embodiment 6 may be constructed by comprising an insulation-type converter such as a forward converter represented by a full-bridge converter can be configured also in Embodiment 6. In other words, the present invention may be configured to comprise a smoothing circuit having components corresponding to the inductance device and the smoothing capacitor, and which produces an output voltage by averaging a rectangular wave voltage. Therefore, in this switching power supply, it is possible to correct by taking a term corresponding to Vout as N×Vout by using the correction equation when a winding ratio of the transformer is N. Such a configuration obtains effects similar to Embodiment 6.

As clarified by the detailed explanations of the embodiments, the present invention has the following effects.

In the present invention, the output current can be made constant when the overcurrent protection circuit operates, regardless of changes in the input voltage Vin and the output voltage Vout. It is thus possible to provide a safe and stabilized switching power supply apparatus.

The present invention is intended to solve the various problems encountered in the conventional overcurrent protection circuit. More particularly, the present invention is intended to provide an overcurrent protection circuit of a switching power supply apparatus being high in safety and capable of carrying out overcurrent protection stably and securely. This is attained by restricting the output current of a circuit comprising circuit devices having small inductances at a constant value, even when its input voltage and output voltage change.

Although the present invention has been described with respect to its preferred embodiments in some detail, the disclosed contents of the preferred embodiments may change in the details of the structure thereof, and any changes in the combination and sequence of the components maybe attained without departing from the scope and spirit of the claimed invention.

What is claimed is:

1. A switching power supply apparatus, comprising:
   switching means for forming a rectangular wave voltage by turning ON/OFF an input voltage (Vin),
   a smoothing circuit for forming an output voltage (Vout) by smoothing said rectangular wave voltage by using an inductance device and a capacitor, and
   overcurrent protection means for restricting an output current by detecting the peak current of a current flowing through said switching means, wherein
   in said overcurrent protection means, by using said input voltage (Vin), said output voltage (Vout) and a voltage proportional to the ON/OFF ratio (D) of said switching means, the detected peak current value is corrected by an error signal proportional to the value of (Vout−D× Vout).

2. A switching power supply apparatus in accordance with claim 1, comprising a multiplier for forming said error signal.

3. A switching power supply apparatus in accordance with claim 1, wherein said overcurrent protection means is further provided with peak voltage holding means.

4. A switching power supply apparatus, comprising:
   switching means for forming a rectangular wave voltage by turning ON/OFF an input voltage (Vin),
   an insulating transformer having a primary winding connected to said switching means and a secondary winding connected to an output terminal, the winding ratio of said windings being N:1,
   output voltage forming means, connected to said secondary winding, for forming an output voltage by carrying out rectification and smoothing by using rectifying means, an inductance device and a capacitor, and
   overcurrent protection means for restricting an output current by detecting the peak current of a current flowing through said switching means, wherein
   in said overcurrent protection means, by using said input voltage (Vin), said output voltage (Vout) and the ON/OFF ratio (D) of said switching means, the detected peak current value is corrected by an error signal proportional to the value of (Vout−D×Vout).

5. A switching power supply apparatus in accordance with claim 4, comprising a multiplier for forming said error signal.

6. A switching power supply apparatus in accordance with claim 4, wherein said switching power supply apparatus has an insulating transformer and is formed of a full-bridge converter.

7. A switching power supply apparatus in accordance with claim 6, comprising:
   a first series circuit of first switching means and second switching means repeatedly turning ON/OFF alternately and connected in series at a first connection point,
   a second series circuit of third switching means and fourth switching means repeatedly turning ON/OFF alternately and connected in series at a second connection point,
   said transformer having a primary winding connected between said first connection point and said second connection point,
   rectangular wave voltage applying means for applying a rectangular wave voltage to said primary winding of said transformer,
   rectifying means for rectifying voltages induced across the secondary windings of said transformer,
   a smoothing circuit for smoothing said rectangular wave voltage from said rectifying means by using an inductance device and a capacitor and for outputting a smoothed voltage, and
   a circuit for forming a voltage proportional to said output voltage by averaging the voltage at said first connection point.

8. A switching power supply apparatus in accordance with claim 7, comprising:

said first series circuit of said first switching means and said second switching means repeatedly turning ON/OFF alternately and connected in series at said first connection point, said second series circuit of said third switching means and said fourth switching means repeatedly turning ON/OFF alternately and connected in series at said second connection point, said transformer having said primary winding connected between said first connection point and said second connection point, said rectangular wave voltage applying means for applying said rectangular wave voltage to said primary winding of said transformer, a smoothing circuit for smoothing rectangular wave voltages induced across said secondary windings of said transformer by using an inductance device and a capacitor and for outputting a smoothed voltage, an averaging circuit for forming voltages proportional to said output voltage by averaging the voltage at said first connection point and the voltage at said second connection point, and an error signal forming circuit for forming an error signal obtained by averaging the difference voltage between said input voltage and said output voltage at the time when said first switching means or said second switching means is ON.

9. A switching power supply apparatus in accordance with claim 1, wherein said detected peak current is corrected by the value of $\{D \times (Vin-Vout)\}$ instead of the value of $(Vout-D \times Vout)$.

10. A switching power supply apparatus in accordance with claim 4, wherein said detected peak current is corrected by the value of $\{D \times (Vin-N \times Vout)\}$ instead of the value of $(Vout-D \times Vout)$.

11. A switching power supply apparatus in accordance with claim 1, wherein said detected peak current is corrected by both a value proportional to $(Vout-D \times Vout)$ and a value proportional to $(Vin-Vout)$.

12. A switching power supply apparatus in accordance with claim 4, wherein said detected peak current is corrected by both a value proportional to $(Vout-D \times Vout)$ and a value proportional to $(Vin-N \times Vout)$.

13. A switching power supply apparatus in accordance with claim 1, wherein said detected peak current is corrected by both a value proportional to $\{D \times (Vin-Vout)\}$ and a value proportional to $(Vin-Vout)$ instead of the value of $(Vout-D \times Vout)$.

14. A switching power supply apparatus in accordance with claim 4, wherein said detected peak current is corrected by both a value proportional to $\{D \times (Vin-N \times Vout)\}$ and a value proportional to $(Vin-N \times Vout)$ instead of the value of $(Vout-D \times Vout)$.

15. A switching power supply apparatus, comprising:

switching means for forming a rectangular wave voltage by turning ON/OFF an input voltage (Vin), an inductance device for storing exciting energy at the time when said switching means is ON and said input voltage is applied and for outputting the stored exciting energy at the time when said switching means is OFF, and overcurrent protection means for restricting output current by detecting the peak current (Ip) of the current flowing through said switching means, wherein said overcurrent protection means carries out the arithmetic operation of $\{(1-D) \times (Ip+K \times Vout)\}$ with respect to the detected peak current Ip and with K used as a constant, and determines the ON period of said switching means so that the arithmetically operated value becomes constant.

* * * * *